United States Patent
Araki

(10) Patent No.: US 8,799,677 B2
(45) Date of Patent: Aug. 5, 2014

(54) ENCRYPTED SEARCH DATABASE DEVICE, ENCRYPTED SEARCH DATA ADDING/DELETING METHOD AND ADDING/DELETING PROGRAM

(71) Applicant: Toshinori Araki, Tokyo (JP)

(72) Inventor: Toshinori Araki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/977,471

(22) PCT Filed: Dec. 5, 2012

(86) PCT No.: PCT/JP2012/081555
§ 371 (c)(1),
(2), (4) Date: Jun. 28, 2013

(87) PCT Pub. No.: WO2013/084957
PCT Pub. Date: Jun. 13, 2013

(65) Prior Publication Data
US 2014/0095889 A1    Apr. 3, 2014

(30) Foreign Application Priority Data
Dec. 9, 2011 (JP) ................ 2011-269740

(51) Int. Cl.
*G06F 21/00* (2013.01)
(52) U.S. Cl.
USPC ............ 713/189; 713/193; 726/26; 726/27; 707/736; 707/741; 707/E17.001; 707/E17.014
(58) Field of Classification Search
None
See application file for complete search history.

(56) References Cited

U.S. PATENT DOCUMENTS

| 8,380,720 B2* | 2/2013 | Chang et al. ................ 707/747 |
| 8,533,489 B2* | 9/2013 | Roeder et al. ............... 713/189 |
| 2009/0300351 A1* | 12/2009 | Lei et al. ..................... 713/165 |
| 2011/0004607 A1* | 1/2011 | Lokam et al. ............... 707/759 |
| 2013/0046974 A1* | 2/2013 | Kamara et al. .............. 713/165 |

FOREIGN PATENT DOCUMENTS

| JP | 2002-278970 A | 9/2002 |
| JP | 2002-300614 A | 10/2002 |
| JP | 2008-053818 A | 3/2008 |
| JP | 2008-517354 A | 5/2008 |

(Continued)

OTHER PUBLICATIONS

Liesdonk et al., Computationally Efficient Searchable Symmetric Encryption, 2010, Springer-Verlag Berlin Heidelber, SDM2010, LNCS 6358, pp. 87-100.*

(Continued)

*Primary Examiner* — Jung Kim
*Assistant Examiner* — Adrian Stoica
(74) *Attorney, Agent, or Firm* — Sughrue Mion, PLLC

(57) ABSTRACT

The encrypted search result adding module of the encrypted search database device includes: a search result generating unit which generates a linear list as a list of search results for newly registered document data; an initial point information generating unit which generates initial point information as address of first data corresponding to a keyword; an initial point information encrypting unit which encrypts and adds/stores generated initial point information with an encryption key; and an encrypted linear list adding unit which generates and adds/stores an encrypted linear list by encrypting the linear list with the encryption key, and stores each keyword and final point information as the address of last data in the encrypted linear list for the keyword as adding information.

10 Claims, 19 Drawing Sheets

(56) References Cited

FOREIGN PATENT DOCUMENTS

| JP | 2010-061103 A | 3/2010 |
|---|---|---|
| JP | 2010-164835 A | 7/2010 |
| JP | 2010-205258 A | 9/2010 |

OTHER PUBLICATIONS

Shmueli et al., Designing Secure Indexes for Encrypted Databases, Data and Applications Security, 2005, LNCS3654, IFIP, pp. 54-68.*

Written Opinion of the International Searching Authority issued Jan. 29, 2013 in PCT/JP2012/081555.
Reza Curtmola et al., "Searchable Symmetric Encryption: Improved Definitions and Efficient Constructions", ACM Conference on Computer and Communications Security 2006, pp. 33.
International Search Report issued Jan. 29, 2013 in PCT/JP2012/081555.
Wakaha Ogata, et al., "What should be hidden in searchable symmetric encryption?", SCIS 2011, The 2011 Symposium on Cryptography and Information Security, Kokura, Japan, Jan. 25-28, 2011, The Institute of Electronics, Information and Communication Engineers.

* cited by examiner

FIG. 9

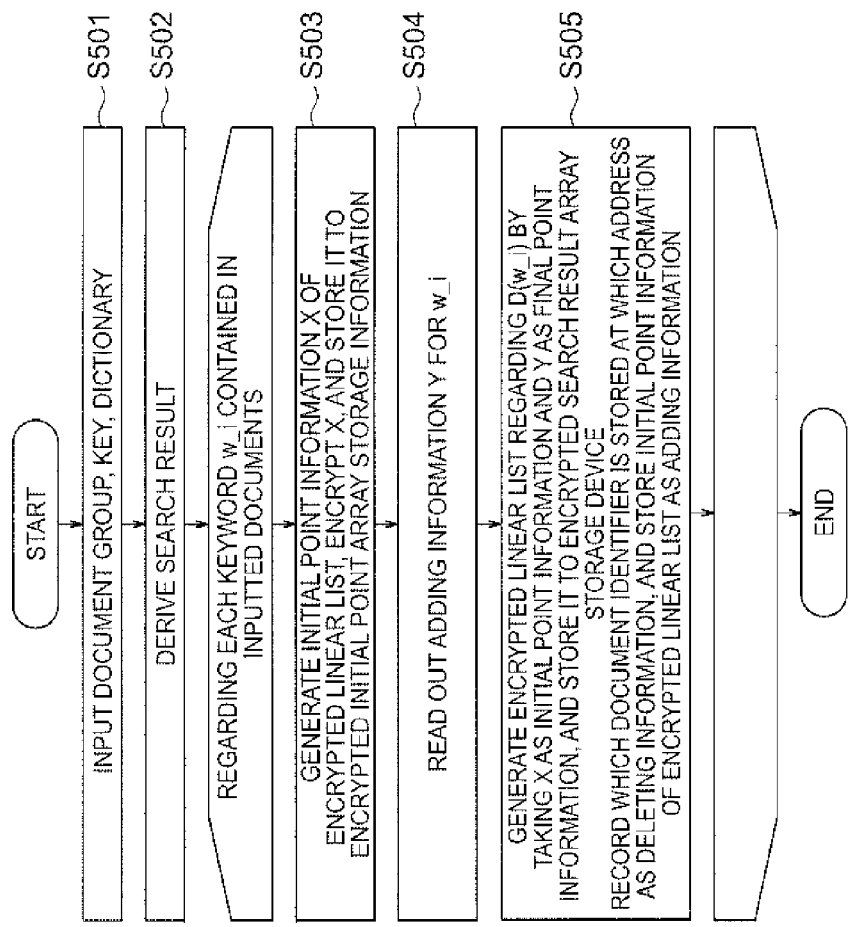

- S501: INPUT DOCUMENT GROUP, KEY, DICTIONARY
- S502: DERIVE SEARCH RESULT
- S503: REGARDING EACH KEYWORD w_i CONTAINED IN INPUTTED DOCUMENTS
- S504: GENERATE INITIAL POINT INFORMATION X OF ENCRYPTED LINEAR LIST, ENCRYPT X, AND STORE IT TO ENCRYPTED INITIAL POINT ARRAY STORAGE INFORMATION
- S505: READ OUT ADDING INFORMATION Y FOR w_i
- GENERATE ENCRYPTED LINEAR LIST REGARDING D(w_i) BY TAKING X AS INITIAL POINT INFORMATION AND Y AS FINAL POINT INFORMATION, AND STORE IT TO ENCRYPTED SEARCH RESULT ARRAY STORAGE DEVICE
- RECORD WHICH DOCUMENT IDENTIFIER IS STORED AT WHICH ADDRESS AS DELETING INFORMATION, AND STORE INITIAL POINT INFORMATION OF ENCRYPTED LINEAR LIST AS ADDING INFORMATION

Related Art

Related Art

Related Art

Related Art

Related Art

Related Art

Related Art

ENCRYPTED SEARCH DATABASE DEVICE, ENCRYPTED SEARCH DATA ADDING/DELETING METHOD AND ADDING/DELETING PROGRAM

CROSS REFERENCE TO RELATED APPLICATIONS

This application is a National Stage of International Application No. PCT/JP2012/081555 filed Dec. 5, 2012, claiming priority based on Japanese Patent Application No. 2011-269740 filed Dec. 9, 2011, the contents of all of which are incorporated herein by reference in their entirety.

TECHNICAL FIELD

The present invention relates to an encrypted search database device, an encrypted search data adding/deleting method, and an adding/deleting program. More specifically, the present invention relates to an encrypted search database device and the like capable of reducing the risk of leaking information when adding, deleting, and updating documents.

BACKGROUND ART

It has been quite a while since databases using computers became deeply involved with operations of organizations such as business enterprises and public institutions. One of the basic functions of the database is data searching by using a keyword. This function is to extract a document containing a specific keyword from a plurality of documents registered in the database. A tremendous number of documents are registered in the database, so that it is inefficient to analyze all the sentences contained within the documents to judge whether or not the keyword is contained therein every time there is a request from a user for searching.

Therefore, with most of the databases, it is possible to generate an index file for searching and to use it at the time of searching. The index file saves a list of corresponding documents as the search result for a specific keyword. The index file is updated regularly (e.g., every day at a prescribed time) in accordance with the actions of adding, deleting, and updating the document data. The use of the index file makes it possible to speed up the processing related to the searching.

In the meantime, in a database within an organization such as a business enterprise, a great number of pieces of information regarding the industrial secret and personal secret which are not allowed to be leaked to the outside of the organization are registered. Naturally, searching by using a keyword is required for such information as well. However, even when the document file itself is encrypted, there is a risk of leaking the information regarding which document contains which keyword from the saved index file. Thus, the simply encrypted index file cannot be used for search processing unless it is decrypted.

Non-Patent Documents 1 and 2 describe specific methods regarding the technique called Searchable Symmetric Encryption (referred to as SSE hereinafter) for improving the efficiency of performing keyword search while preventing information from being leaked from an index file. In Non-Patent Document 1, two SSE methods are depicted. Here, the method (referred to as SSE 1 hereinafter) depicted from page 15 to page 20 of that document will be described.

(Structure of SSE 1)

The SSE system (SSE1) depicted in Non-Patent Document 1 will be described. With this system, used is the data of a structure acquired by encrypting a linear list for searching a document with a keyword. For explanations, the preposition regarding the document and the keyword used therein will be described. A document group is expressed as $D=\{D\_1, ---, D\_n\}$, and each document $D\_j$ ($j=1, ---, n$) has an identifier that can be used for discrimination. As the identifier, a file name, sequential numbers, or the like can be used.

FIG. 10 is an explanatory chart showing the structure of a keyword dictionary 810 (index file) $\Delta$ of the SSE system depicted in Non-Patent Document 1. The keyword dictionary 810 $\Delta$ is a set of document identifier information 810b containing $w\_i$ in D provided that the set of searchable keywords is $\Delta=\{w\_1, ---, w\_d\}$ and a search result is $D(w\_i)$ for a keyword 810a($w\_i$). Note that id(D, $w\_i$, j) shows the identifier of the corresponding j-th document contained in $D(w\_i)$.

FIG. 10 shows a table of document identifier information 810b(id(D($w\_i$))) that is the search result based on a keyword 810a($w\_i$) contained in the dictionary $\Delta$ for the document group D. As one of the specific methods for saving such table as data, there is a method using a data structure called a linear list. As the linear list, there are a unidirectional list and a bidirectional list. Here, the linear list in a case of using the unidirectional list will be described.

FIG. 11 is an explanatory chart showing examples of unidirectional lists 820a to b in which three integer values are stored, which are used in the example of the SSE system depicted in Non-Patent Document 1 shown in FIG. 10. The two squares placed side by side show one element constituting a list. The one element is a node used herein. An integer value is written in the square on the left side. This is the data carried by the node. An arrow is written in the square on the right side, and the arrow indicates the next node on the list. This shows the address on the memory or the position on the storage device where each node is stored (simply referred to as address hereinafter).

Provided that the address and the value of the i-th node is ad_i and val_i, respectively, the i-th node can be expressed as (ad_i, val_i, ad_{i+1}) as a set of data of the address where the node is stored, the stored value, and the address where the next node is stored. Hereinafter, this expression is used. The end of the list can be expressed by using "Null" which is a special sign for the next address or for the value. In the unidirectional list 820a shown in FIG. 11 is an example of the former (the end of the list is shown by using an empty node), and the unidirectional list 820b is an example of the latter (the end of the list is shown by using "Null" value). For explanations, the head node in the linear list is referred to as the initial point, and the end of the node as the final point.

For recording the search result by using the linear list, used herein is a method which records the search result by using a search result array and an initial point array. In the search result array, a linear list of the search result for each keyword is recorded for each node. The linear lists for all the keywords are stored in the array. However, information regarding which address the initial point of the linear list is at for each keyword is not stored. The information regarding the initial point is stored in the initial point array that is the other array.

FIG. 12 is an explanatory chart showing a search result array 830 and an initial point array 840 in which the search result id_{i,1}, id_{i,2}, id_{i,3} as the search result regarding a keyword w_i is put into a linear list in the case of the SSE system depicted in Non-Patent Document 1 shown in FIG. 10. As the initial point of the search result regarding the keyword w_i, ad_{i,1} is recorded as the i-th element of the initial point array 840.

The corresponding relation such as "the initial point regarding w_i is recorded on the i-th" may be defined by using the information such as the order of the keyword within the dictionary in the alphabetical order. Any methods can be used as long as the corresponding relation can be defined uniquely. Here, the case where the initial point information for w_i is recorded on the i-th is used as an example for simplifying the explanation.

The method for acquiring the search result by using the linear list shown in FIG. 12 will be described. FIG. 12 shows the example of the case where the search result regarding the keyword w__1 is id_{i, 1}, id_{i, 2}, id_{i, 3}. Hereinafter, processing for reading out the search result regarding w_i from the arrays will be described.

1. First, the i-th address 840b=ad_{i, 1} of the initial point array 840 is read out.
2. Then, the first search result 830b=id_{i, 1} and the next address 830c=ad_{i, 2} that is the array where the next search result is stored are acquired by referring to the ad_{i, 1}-th element of the address 830a of the search result array 830.
3. Then, the second search result 830b=id_{i, 2} and the next address 830c=ad_{i, 3} that is the array where the next search result is stored are acquired by referring to the ad_{i, 2}-th element of the address 830a of the search result array 830.
4. Then, the third search result 830b=id_{i, 3} and the next address 830c="Null value" that is the array where the next search result is stored are acquired by referring to the ad_{i, 3}-th element of the address 830a of the search result array 830. Thus, id_{i, 1}, id_{i, 2}, and id_{i, 3} are outputted as the search result regarding the keyword w_i.

With such method, when a document is added anew, information can be added as much as it is desired as long as there is an empty address in the array. Therefore, it is effective for the cases of using a database where documents are added one after another. In the meantime, it is evident that those arrays contain information regarding registered documents.

Acquired information is the information regarding what keyword a certain document contains and the similarity between two different documents. Thus, the use of auxiliary data constituted with the initial point array and the search result array in an encrypted database may result in leaking the information regarding the registered documents.

In order to make the keyword search efficient in the encrypted database while preventing information from being leaked, the SSE system used for supporting the search in the data in which the linear list is encrypted is proposed in Non-Patent Document 1 (SSE1).

In the explanations of this Description, a function where output is defined by input and key information (referred to as keyed hereinafter) and replacement where output is defined by input and key information (referred to as keyed replacement) are used. In a keyed function F, the output when the key is k and the input is x is expressed as F(k; x). The output when the input is n-pieces of numerical values such as x__1, - - - , x_n is written as F(k; x__1, - - - , x_n). The keyed replacement is expressed in the same manner. That is, the first element within a parenthesis is the key, and the second element on the right side of a semicolon is the input.

For encrypting the value, a common-key encryption system with which encryption processing and decryption processing are executed by using a common private key is used. An encryption function of the common key encryption is referred to as Enc( ) and a decryption function is referred to as Dec( ). The result acquired by encrypting data d with the key k is written as Enc(k; d), and the result acquired by decrypting a ciphertext c with the key k is written as Dec(k; c).

SSE1 is the system which uses the initial point array and the search result array described above as the auxiliary data used for searching in combination with the encryption processing. Hereinafter, the initial point array 840 and the search result array 830 on which encryption is applied are referred to as an encrypted initial point array 860 and an encrypted search result array 850, respectively. In the encrypted search result array, a list-type data structure (referred to as an encrypted linear list) acquired by modifying the linear list is used. This encrypted linear list will be described.

(Explanation of Encrypted Linear List)

The i-th node of the linear list is constituted with a set of three pieces such as (ad_i, val_i, ad_{i+1}). In the encrypted linear list, a common encryption key k_i is prepared for each node of the linear list, and data of four pieces such as (ad_i, Enc(k_i; val_i), Enc(k__1; k _{i+1}), Enc(k_i; ad_{i+1})) is defined as one set.

At the ad_i address, remaining three pieces of data are stored. By combining the values of the three pieces of stored data with k_i, it is possible to acquire val_i, k_{i+1}, and ad_{i+1} by decryption. This, the nodes after the i-th node can be acquired. Therefore, with the use of ad__1 and k__1, all the values stored in the encrypted linear list can be acquired. Hereinafter, those values are considered as the initial point information of the encrypted linear list.

For the end of the list, the next address may be set as a special sign "Null" as in the case of the linear list or a node where nothing is stored (referred to as an empty node hereinafter) may be set as a next address for expressing the end of the list. In this Description, hereinafter, used is a type of encrypted linear list in which an empty address is used for the next address stored at the end of the list. Hereinafter, a set of the next address stored in the last node and the key used for encrypting the next address is considered as the final point information.

The value, the encryption key of the next address, and the next address are all encrypted with a same key. However, those may be encrypted with different keys from each other by calculating different keys by using a keyed function having k_i as the key. In such case, K(k_i; 1), K(k_i; 2), K(k_i; 3) are calculated by using a keyed function K to use each of those as the encryption keys. 1, 2, and 3 merely are examples, and other values defined in advance may be used as well. Hereinafter, a case of using a single key will be described for making it easy to explain the concept.

(Explanation of Encrypted Search Result Array)

Subsequently, the encrypted search result array using the encrypted linear list will be described. FIG. 13 is an explanatory chart showing the encrypted initial point array 860 and the encrypted search result array 850 using the encrypted linear list in a case of the SSE system (SSE1) depicted in Non-Patent Document 1 shown in FIG. 10. The encrypted search result array 850 is an array in which the search results regarding a plurality of keywords are stored by using the encrypted linear lists. When the address of the initial point information of the encrypted linear list for each keyword w_i is written as ad_{w_i} and the key is written as k_{w_i}, the encrypted search result array 850 is a table which stores the encrypted search results, the encryption keys, and the next addresses 850b corresponding to the addresses 850a.

The encrypted initial point array is an array in which the initial point information for each keyword is encrypted and stored. The corresponding keyword search result can be extracted from the encrypted search result array by using it. Nest, the encrypted initial point array will be described.

The encrypted initial point array is stored by processing ad_{w_i} and k_{w_i} which are a set of the encrypted linear list initial point information regarding each keyword w_i by using the encryption key k_e and the replacement key k_p. Provided that P is the keyed replacement and F is the keyed function, the encrypted initial point array is a table in which the encrypted address and the encryption key 860b, i.e., Enc(F(k_e; w_i); ad_{w_i}) and Enc(F(k_e; w_i); k_{w_i}), are stored at the address 860a=P(k_p; w_i). This processing using the encryption key k_e and the replacement key k_p is called the encryption processing of the initial point information.

That is, ad_{w_i} and k_{w_i} can be acquired by decrypting the ciphertext by using F{k_e; w_i} through referring to the P(k_p; w_i) address by using P(k_p; w_i) and F(k_e; w_i). As described earlier, the search result regarding w_i can be acquired from the encrypted search result array by using ad_{w_i} and k_{w_i}.

In the case where the initial point array and the search result array are used, the search result can be acquired without using any special information other than the keyword. In the meantime, in the case where the encrypted initial point array and the encrypted search result array are used, the encryption key k_e and the replacement key k_p are required for acquiring the initial point information. Thus, even when the encrypted initial point array and the encrypted search result array are stored, the search result regarding the keyword cannot be referred to without those keys. When P(k_p; w_i) and F(k_e; w_i) regarding a given keyword w_i are known, it is possible to refer to the corresponding search result.

Note that k_p and k_e may be generated as K(k; 1)=k_p and K(k; 2)=k_e by using a single key k and the keyed function K. "1" and "2" within each parenthesis merely are examples, and those may be other values given in advance. Hereinafter, in a case where it is assumed that k_p and k_e are used as a set, only one of the values such as the key k is to be written. With such method, the number of the keys to be stored and the storage capacity therefore can be reduced.

(Generation of Encrypted Initial Point Array and Encrypted Search Result Array)

The processing for generating the encrypted initial point array and the encrypted search result array can be classified into following four stages of processing.

1. Processing for generating search result.
2. Processing for generating commonly used data.
3. Processing for generating encrypted search result array.
4. Processing for generating encrypted initial point array.

"1. Processing for generating search result" is the processing for generating a keyword search result for an inputted document and the dictionary.

"2. Processing for generating commonly used data" is the processing for storing the initial point information of the encrypted linear list generated for each keyword in the encrypted search result array and storing the encrypted linear list generated for each keyword in the encrypted initial point array. In such processing, the initial point information of the encrypted linear list is used in common.

"3. Processing for generating encrypted search result array" is the processing for generating the initial point information for each of the keywords. With this processing, an encrypted linear list is generated based on the search result generated for each keyword and the initial point information, and stored in the encrypted search result array. The keys for the address after the initial point are generated randomly in such a manner that no duplication occurs for the addresses. A method of using a counter or a method of storing empty addresses can be used. The use of the keyed replacement with the method of using the counter makes it difficult to know which addresses are linked as the list in the encrypted search result array.

"4. Processing for generating encrypted initial point array" is the processing for encrypting the initial point information generated for each keyword by using the encryption key and storing it to the encrypted initial point array defined by the replacement key and the keyword.

(Structure of Encrypted Database Device)

FIG. 14 is an explanatory chart showing the structure of an encrypted database device 900 which executes the SSE system (SSE1) depicted in Non-Patent Document 1 shown in FIG. 10. The encrypted database 900 is constituted with: a processor 901 which is the main body for executing a computer program; a storage module 902 which stores data; and an input/output module 903 which inputs/outputs data from the outside.

The processor 901 operates as an encrypted search result generating module 910, a trapdoor generating module 902 to be described later, and an encrypted database searching module 940 through operating an encrypted database program. Further, the storage module 902 operates as an encrypted search result storage module 920 which stores the encrypted initial point array and the encrypted search result array as the data regarding the search of the encrypted database.

FIG. 15 is an explanatory chart showing the structure of the encrypted search result generating module 910 shown in FIG. 14. The encrypted search result generating module 910 includes: a generation processing control unit 911; a search result generating unit 912; an initial point information generating unit 913; an encrypted linear list generating unit 914; and an initial point information encrypting unit 915. Further, the encrypted search result storage module 920 includes an encrypted search result array storage unit 921 and an encrypted initial point array storage unit 922.

The encrypted search result generating module 910 takes each of the keys, the documents to be registered, and the dictionary as input information from the outside via the input/output module 903, and stores the values to the encrypted search result array storage unit 921 and the encrypted initial point array storage unit 922, respectively, which are provided to the encrypted search result storage module 920.

The generation processing control unit 911 controls each of the functional units provided to the encrypted search result generating module 910 by taking the keys, the documents to be registered, and the dictionary as the input information. The search result generating unit 912 takes the documents and the dictionary as the input information, and outputs the search results of each of the keywords. The initial information generating unit 913 outputs the initial point information of the encrypted linear list to the outside via the input/output module 903.

The encrypted linear list generating unit 914 generates the encrypted linear list by taking the search result for each keyword and the initial point information as the input information, and stores it to the encrypted search result array storage unit 921. The initial point information encrypting unit 915 encrypts the initial point information of the encrypted linear list by using the inputted key, and updates the value to be stored to the encrypted initial information array storage unit 922 by using the key as the input information.

The encrypted search result array storage unit 921 stores the encrypted search result. The encrypted initial point array storage unit 922 stores the encrypted initial point array.

FIG. 16 is a flowchart showing an operation of the encrypted search result generating module 910 shown in FIG. 15. First, a key, a document group D={D_1, - - - , D_n}, and a dictionary Δ={w_1, - - - , w_d} are inputted to the generating processing control unit 911 via the input/output module 903 (step S951). The generation processing control unit 911 inputs the document group D and the dictionary Δ to the search result generating unit 912, and acquires the search result as the output thereof regarding the dictionary Δ of the document group D (step S952).

The generation processing control unit 911 executes following processing (step S953 to step S955) regarding the search result D(w_i) of each keyword w_i. First, the generation processing control unit 911 operates the initial point information generating unit 913 and acquires the initial point information X that is the output thereof (step S953). Subsequently, the generation processing control unit 911 inputs the initial point information X, the key, and w_i to the initial point information encrypting unit 915, and the initial information encrypting unit 915 encrypts the initial point information X by using the key and stores it to the address of the encrypted initial point array storage unit 922 defined by the key and the keyword (step S954).

In parallel to step S954, the generation processing control unit 911 inputs the initial point information X and D(w_i) to the encrypted linear list generating unit 914. The encrypted linear list generating unit 914 generates the encrypted linear list regarding the initial point information X and D(w_i), and stores it to the encrypted search result array storage unit 921 (step S955).

Next, the processing for searching data done with the encrypted initial point array and the encrypted search result array will be described. As descried above, the encrypted search result array is generated by using k_e and k_p.

As shown in FIG. 13, in order to extract the initial point information of the encrypted linear list regarding the keyword w_i from the encrypted initial array, P(k_p; w_i) and F(k_e; w_i) can be used. The set of P(k_p; w_i) and F(k_e; w_i) is referred to as a trapdoor for the keyword w_i. By using it, the search result regarding the keyword w_i can be extracted from the encrypted search result array.

FIG. 17 is an explanatory chart showing the structure of the trapdoor generating module 930 and the encrypted database searching module 940 shown in FIG. 14. The encrypted database searching module 940 includes an initial point information extracting unit 941 and a search result extracting unit 942.

The trapdoor generating module 930 calculates the trapdoor for w_i by taking the key k=(k_e, k_p) and the keyword w_i inputted from the outside via the input/output module 930 as the input. The initial point information extracting unit 941 decrypts a value η stored at address γ of the encrypted initial point array storage unit 922 by taking the trapdoor as the input, and outputs the initial point information of the encrypted linear list as the search result.

The search result extracting unit 942 takes the initial point information as the input, extracts the search result from the encrypted search result array storage unit 921 by using the inputted initial point information, and outputs it to the outside via the input/output module 903.

FIG. 18 is a flowchart showing an operation of the trapdoor generating module 930 shown in FIG. 14 and FIG. 17. When the key k=(k_e, k_p) and the keyword w_i are inputted to the trapdoor generating module 930 from the outside via the input/output module 930 (step S961), the trapdoor generating module 930 calculates γ=P(k_p; w_i) and η=F(k_e; w_i), and outputs the values of γ and η to the encrypted database searching module 940 (step S962).

FIG. 19 is a flowchart showing an operation of the encrypted database searching module 940 shown in FIG. 14 and FIG. 17. When γ and η of the trapdoor outputted in step S962 of FIG. 18 are inputted to the encrypted database searching module 940 (step S971), the initial point information extracting unit 941 upon receiving the input of γ and η outputs the initial point information to the search result extracting unit 942 (step S972). Then, the search result extracting unit 942 upon receiving the input outputs the search result to the outside via the input/output module 903 (step S973).

An example of the processing for registering the index for the document group D={D_1, - - - , D_n} and the dictionary Δ carried by the user into the database and an example of the operation of the search processing by using the index executed with SSE1 described above are as follows.

(Processing for Registering Search Data)
1. A user generates key k.
2. Then, the user generates an encrypted search result by taking the key k, the document group D, and the dictionary Δ as the input.
3. Then, the user generates the key for encryption, and encrypts D by using the generated key.
4. Then, the encrypted search result and the ciphertext are transmitted to the encrypted database device 900 to be stored therein.

(Processing for Searching)
The followings show the example of the operation of the search processing regarding the keyword w_i. The user herein is the user who holds the encryption key k legitimately and executes the processing for registering the data.
1. The user generates a trapdoor by taking k and w_i as the input, and transmits it to the encrypted database device 900.
2. The encrypted database device 900 executes the search processing by taking the trapdoor and the encrypted search result as the input to acquire the search result. The search result is an aggregation of the document identifiers.
3. The encrypted database device 900 transmits, to the user, the encrypted documents corresponding to the aggregation of the identifiers that are the result of the search processing.
4. The user decrypts the received documents, and acquires the search result.

The searching method by SSE1 described above has following characteristics.

First, a keyword itself is not used for requesting a search. Each trapdoor is converted from a keyword by a key held by the user. The key is selected randomly, and the corresponding relation between the trapdoor and the keyword is unknown to the encrypted database device 900 side.

Further, the search results for each of the keywords are rearranged and encrypted. Only the encrypted section regarding the corresponding keyword is decrypted by the trapdoor. Thus, those who do not have a legitimate key can only know that the entire search results correspond to some of the keywords w_i but cannot know which keyword it is.

The information mentioned above is the information the database can acquire in a case of using the table and the linear list shown in FIG. 10. That is, the use of SSE1 makes it possible to prevent such information from being leaked.

Regarding this, there are following Patent Documents. Among those, Patent Document 1 describes a personal database generating method for recording user's preference and performing automatic recording accurately by using a video recording device. Patent Document 2 describes a database for searching a security policy for each terminal and each user. Patent Document 3 describes a database with which encrypted data can be searched at a high speed.

Patent Document 1: Japanese Unexamined Patent Publication 2002-300614
Patent Document 2: Japanese Unexamined Patent Publication 2008-053818

Patent Document 3: Japanese Unexamined Patent Publication 2008-517354

Non-Patent Document 1: Reza Curtmola, Juan A. Garay, Seny Kamara, RafailOstrovsky: Searchable symmetric encryption: improved definitions and efficientconstructions. ACM Conference on Computer and Communications Security 2006: 79-88

Non-Patent Document 2: Wakaha Ogata, Akira Kanaoka, Shin'ichiro Matsuo: What should be hidden in searchable symmetric encryption? SCIS2011

However, SSE1 has a risk of leaking the information regarding the registered document when adding, deleting, and updating a document. Hereinafter, this point will be described.

SSE1 does not have the function for adding, deleting, and updating a document. More specifically, it does not have the function for adding a specific document, the function for deleting a specific document, and the function for updating a specific document. As the processing regarding registration of a document, there is only the processing for generating encrypted search results anew for a plurality of documents. It is not practically possible to frequently repeat the processing for deleting all the encrypted search results and generating new encrypted search results with respect to a tremendous number and volume of documents.

New documents are to be added one after another to the database. Further, each of the registered documents is repeatedly updated and deleted one after another. Therefore, the functions for adding, deleting, and updating a document are essential. It is possible to achieve those functions by utilizing algorithm that constitutes SSE1. However, there is a risk of leaking the information. Hereinafter, the risks generated in each processing will be described.

(Risk when Adding Document)

A case of adding a document containing a keyword w_i whose document identifier is id_a is considered. At the end node of the encrypted linear list regarding the keyword w_i stored in the encrypted search result array, values acquired by encrypting the last identifier id of the search result, the key k_next and ad_next for encrypting the next address are stored.

Provided that the key for encrypting the address is k_end, the values Enc(k_end; id), Enc(k_end; k_next), and Enc(k_end; ad_next) are stored, respectively, in that node. Therefore, when the encrypted linear list having ad_next and k_next as the initial point information is added to the encrypted search result, the encrypted linear list in which the additional search result is stored after the current search result is stored to the encrypted search result array.

That is, an encrypted linear list of the added search result is generated by taking the final point information of the already-registered encrypted linear list as the initial point information, and the generated encrypted linear list is added to the encrypted search result array to execute the document adding processing. For executing the adding processing, the final point information regarding the aggregation W of all the keywords containing the document group to be added is simply required.

However, this data can be acquired by executing the search processing by using the trapdoor for each W and the encrypted search result array. Thus, when the trapdoor is transmitted to the user and the database after the registration processing mentioned above is performed, the database can acquire all the unencrypted search results regarding the keywords contained in W. That is, an extremely greater amount of information is to be leaked to the database compared to the case of requesting one operation of search processing to the database device.

(Risk when Deleting Document)

A case of deleting a document D_d whose document identifier is id_d is considered. It is to be noted that id_d is written somewhere on the encrypted linear lists of each of the keywords contained in the document. Through deleting those, the information regarding the target document can be eliminated from the index. Thus, it is necessary to know where on the encrypted linear list regarding each of the keywords id_d is written.

Such information can be acquired by executing the search processing by using the trapdoor for all the keywords contained in the document D_d. As in the case of the adding processing, when the same procedure is executed for the user and the database after performing the registration processing mentioned above, the database device acquires the unencrypted search results for all the keywords contained in D_d. In the case of deleting the document in such method, an extremely greater amount of information is to be leaked to the database also compared to the case of requesting one operation of search processing to the database device.

(Risk when Updating Document)

Update of a document can be executed by deleting the document that is before being updated and adding an updated document. Thus, the both risks described as the risks generated at the time of adding the document and at the time of deleting the document are to be generated.

The risks of leaking information generated at the time of adding, deleting, and updating the document with SSE1 described above, i.e., generated with the technique described in Non-Patent Document 1, are also generated with the other technique described in Non-Patent Document 1 and the technique described in Non-Patent Document 2. Further, the risks are not mentioned in Patent Documents 1 to 3. That is, currently, there is no known technique which can lighten or overcome those risks.

It is therefore an object of the present invention to provide an encrypted search database device, an encrypted search data adding/deleting method and an adding/deleting program, with which there is no risk of leaking information even when adding, deleting, and updating a document.

DISCLOSURE OF THE INVENTION

In order to achieve the foregoing object, the encrypted search database device according to the present invention is an encrypted search database device which performs searching by using a keyword from a plurality of encrypted and registered document data, and the device is characterized to include:

an encrypted search result generating module which generates, for the respective keyword, a search result array as a list of the document data corresponding to the keywords and an initial point array as a list of addresses of first data corresponding to the keyword in the search result array, and generates an encrypted search result array and an encrypted initial point array by encrypting each of those with a given encryption key; an encrypted search result storage module which stores the generated encrypted search result array and the encrypted initial point array; an encrypted database searching module which performs searching by the keyword from the encrypted search result array and the encrypted initial point array by using the keyword and the encryption key; and an encrypted search result adding module which adds contents regarding the document data that is newly registered to the encrypted search result array and the encrypted initial point array, wherein:

the encrypted search result adding module includes
a search result generating unit which generates a linear list that is a list of the search results containing a specific keyword for the newly registered document data,
an initial point information generating unit which generates initial point information that is the address of the first data corresponding to the keyword in the linear list,
an initial point information encrypting unit which encrypts the generated initial point information with the encryption key, and adds/stores it to the encrypted initial point array,
an encrypted linear list adding unit which generates an encrypted linear list acquired by encrypting the linear list with the encryption key, and adds/stores it to the encrypted search result array; and
the encrypted linear list adding unit has a function which stores the respective keyword and the final point information that is the address of the last data in the encrypted linear list for the keyword to an adding information storage module provided in advance as adding information.

In order to achieve the foregoing object, the encrypted search data adding/deleting method is an encrypted search data adding/deleting method used with an encrypted search database device which performs searching by using a keyword from a plurality of encrypted and registered document data, and the method is so characterized that:
an encrypted search result generating module generates, for the respective keyword, a search result array as a list of the document data corresponding to the keyword and an initial point array as a list of addresses of first data corresponding to the keyword in the search result arrays;
the encrypted search result generating module encrypts the search result array and the initial point array with a given encryption key, respectively, and stores those to an encrypted search result storage module;
a search result generating unit of an encrypt search result adding module generates a linear list that is a list of the search results containing a specific keyword for a newly registered document data;
an initial point information generating unit of the encrypted search result adding module generates initial point information that is the address of first data corresponding to the keyword in the linear list;
an initial point information encrypting unit of the encrypted search result adding module encrypts the generated initial point information with the encryption key, and adds/stores it to the encrypted initial point array;
an encrypted linear list adding unit of the encrypted search result adding module generates an encrypted linear list acquired by encrypting the linear list with the encryption key, and adds/stores it to the encrypted search result array; and
the encrypted linear list adding unit of the encrypted search result adding module stores the respective keyword and the final point information that is the address of the last data in the encrypted linear list for the keyword to an adding information storage module provided in advance as adding information.

In order to achieve the foregoing object, the encrypted search data adding/deleting program according to the present invention is an encrypted search data adding/deleting program used with an encrypted search database device which performs searching by using a keyword from a plurality of encrypted and registered document data, which is characterized to cause a computer provided to the encrypted search database device to execute:

a procedure for generating, for the respective keyword, a search result array as a list of the document data corresponding to the keyword and an initial point array as a list of addresses of first data corresponding to the keyword in the search result array;
a procedure for encrypting the search result array and the initial point array with a given encryption key, respectively, and storing those to an encrypted search result storage module;
a procedure for generating a linear list that is a list of the search results containing a specific keyword for a newly registered document data;
a procedure for generating initial point information that is the address of first data corresponding to the keyword in the linear list;
a procedure for encrypting the initial point information with the encryption key, and adding/storing it to the encrypted initial point array;
a procedure for generating an encrypted linear list acquired by encrypting the linear list with the encryption key, and adding/storing it to the encrypted search result array; and
a procedure for storing the respective keyword and the final point information that is the address of the last data in the encrypted linear list for the keyword to an adding information storage module provided in advance as adding information.

As described above, the present invention is structured to generate the linear list and the initial point information for the document data registered additionally, to encrypt each of those, to add/store those to the encrypted search result storage module, and to store the address of the last data to the adding information storage module as the final point information at the same time. Therefore, it is possible to add the data without using the trapdoor containing all the keywords.

This makes it possible to provide the encrypted search database device, the encrypted search data adding/deleting method and the adding/deleting program, which exhibit such an excellent characteristic that there is no risk of leaking information even when adding, deleting, and updating a document.

BRIEF DESCRIPTION OF THE DRAWINGS

FIG. 9 is a flowchart showing an operation of the encrypted search result adding module shown in FIG. 7;

BEST MODES FOR CARRYING OUT THE INVENTION

First Embodiment

Figure 1:
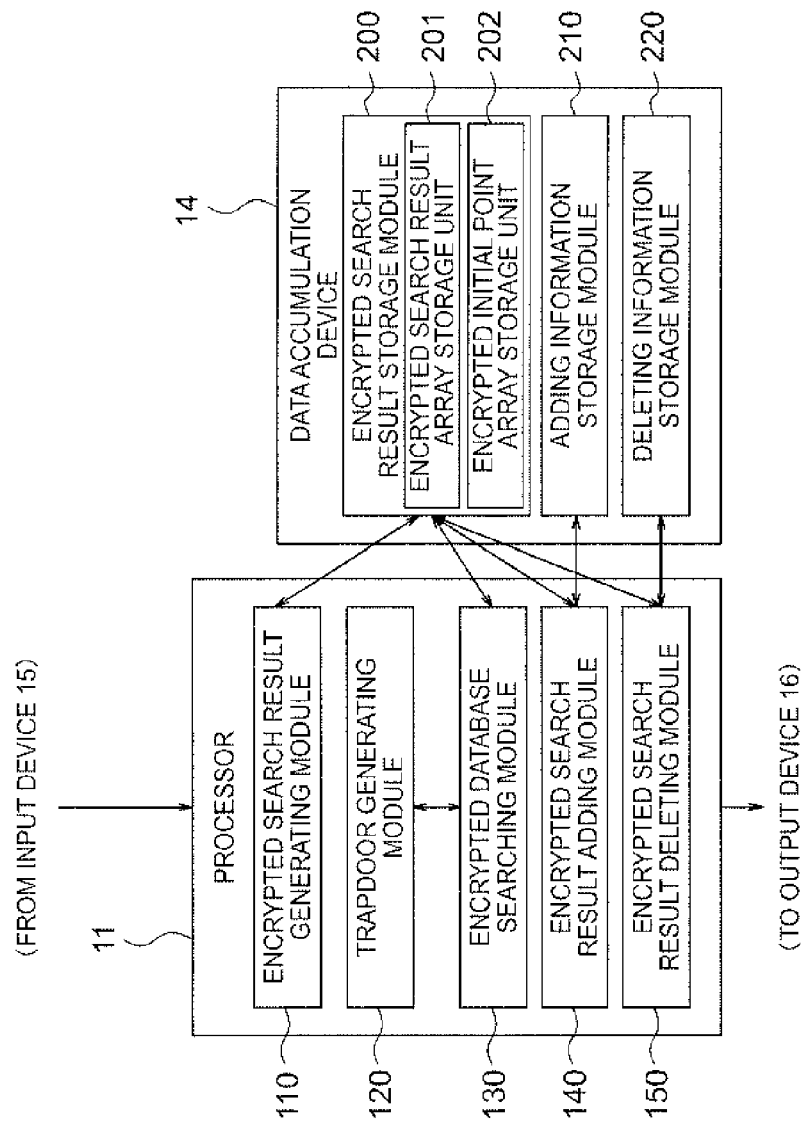
FIG. 1 is an explanatory chart which describes each function achieved by a processor and a data accumulation device shown in FIG. 2 in a more detailed manner.

Hereinafter, the structure of an embodiment of the present invention will be described by referring to the accompanying drawings 1 to 3.

The basic content of the embodiment will be described first, and a more specific content thereof will be described thereafter. An encrypted search database device 10 according to the embodiment is an encrypted search database device which performs searching by using a keyword from a plurality of encrypted and registered document data. The encrypted search database device 10 includes: an encrypted search result generating module 110 which generates, for each of the keywords, a search result array as a list of the document data corresponding to the keywords and an initial point array as a list of addresses of first data corresponding to the keywords in the search result array, and generates an encrypted search result array and an encrypted initial point array by encrypting each of those with a given encryption key; an encrypted search result storage module 200 which stores the generated encrypted search result array and the encrypted initial point array; an encrypted database searching module 130 which performs searching by using the keyword from the encrypted search result array and the encrypted initial point array by using the keyword and the encryption key; and an encrypted search result adding module 140 which adds contents regarding the document data that is newly registered to the encrypted search result array and the encrypted initial point array. Further, the encrypted search result adding module 140 includes: a search result generating unit 142 which generates a linear list that is a list of the search results containing a specific keyword for the newly registered document data; an initial point information generating unit 144 which generates initial point information that is the address of the first data corresponding to the keyword in the linear list; an initial point information encrypting unit 146 which encrypts the generated initial point information with the encryption key, and adds/stores it to the encrypted initial point array; and an encrypted linear list adding unit 145 which generates an encrypted linear list acquired by encrypting the linear list with the encryption key, and adds/stores it to the encrypted search result array. At the same time, the encrypted linear list adding unit 145 has a function which stores each of the keywords and the final point information that is the address of the last data in the encrypted linear list for the keywords to an adding information storage module 210 provided in advance as adding information.

Note here that the encrypted search result adding module 140 includes an adding information reference unit 143 which reads out the adding information when the adding information is stored in the adding information storage module, and the encrypted linear list adding unit 145 has a function which generates the encrypted linear list by taking the adding information read out by the adding information reference unit as the initial point information. Further, the encrypted linear list adding unit 145 has a function which stores, to the encrypted linear list, the data in which the initial point information and the search result containing a specific keyword are associated with each other.

Further, the encrypted linear list adding unit 145 of the encrypted search result adding module 140 has a function which stores the addresses on the encrypted search result storage module 200 where the document identifiers of each of the search results are stored to a deleting information storage module 220 provided in advance. At the same time, provided is an encrypted search result deleting module 150 which, when there is a command for deleting the document corresponding to a specific document identifier from the user, initializes the address on the encrypted search result storage module corresponding to the document identifier stored in the deleting information storage module.

With the structures described above, the encrypted search database device 10 according to the embodiment can become the device with which there is no risk of leaking the information even when adding, deleting, and updating the document.

Hereinafter, this will be described in more details.

Figure 2:
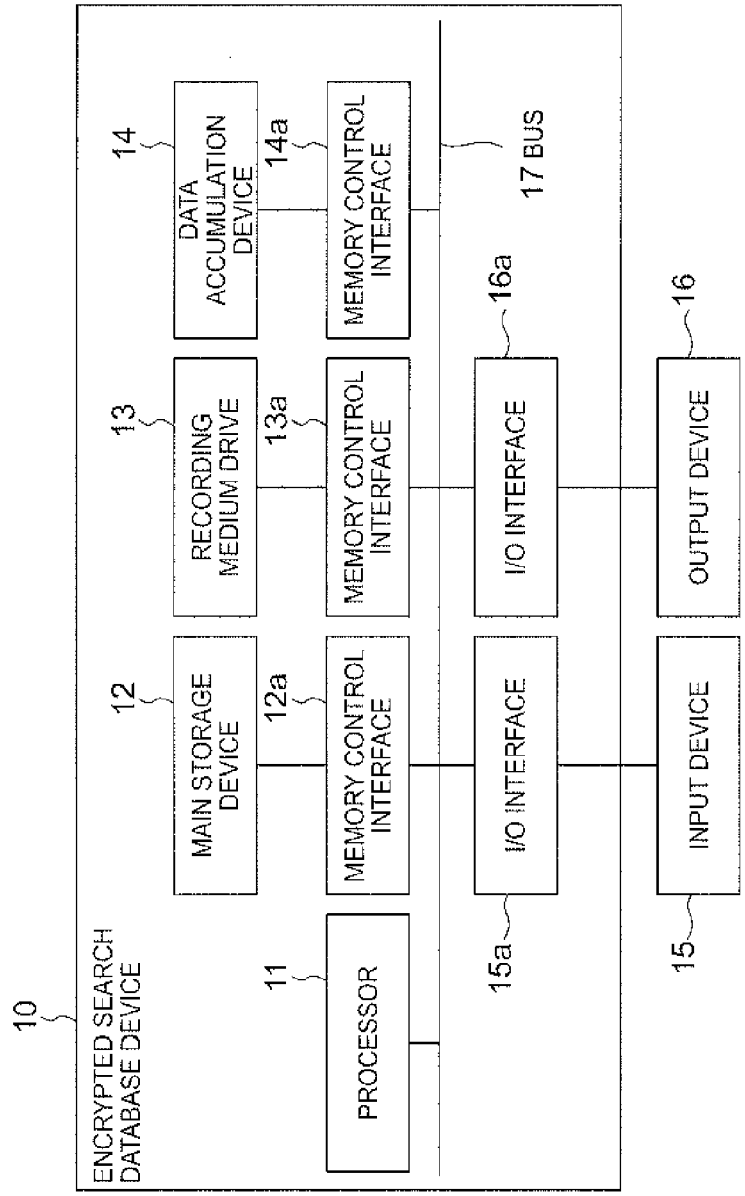
FIG. 2 is an explanatory chart showing the structure of an encrypted search database device according to a first embodiment of the present invention as hardware.

FIG. 2 is an explanatory chart showing the structure of the encrypted search database device 10 according to the first embodiment of the present invention as hardware. The encrypted search database device 10 includes basic structures as a computer, which initially includes: a processor 11 that is the main body for executing a computer program; a main storage device 12 that is a volatile memory for storing a data and a program being operated; a storage medium drive 13 which reads/writes data to/from portable storage media such as an optical disk, a magnetic disk, and a flash memory; and a data accumulation device 14 that is a nonvolatile storage device such as a hard disk.

Further, the encrypted search database device 10 also includes: an input device 15 (e.g., a keyboard, a mouse) for accepting data input from the user; and an output device 16 (e.g., a display, a printer) for presenting the processing result to the user. Each of the main storage device 12, the storage medium drive 13, and the data accumulation device 14 is provided with respective memory control interfaces 12a, 13a, and 14a for mediating the data exchange with the processor 11. Each of the input device 15 and the output device 16 also is provided with respective I/O interfaces 15a and 16a for mediating the data exchange with the processor 11. Each of those devices exchanges the data within the device via a bus 17.

Needless to mention that the encrypted search database device 10 may not be constituted with a single computer alone but may be constituted with a plurality of computers connected mutually via a network. Especially, generally considered is the server-client structure in which the input device 15 and the output device 16 are client devices operated by the user and the processing regarding the actual search is executed by a server device. Further, the server device may also be constituted with a plurality of computers to distribute the load.

FIG. 1 is an explanatory chart for describing each of the functions achieved by the processor 11 and the data accumulation device 14 shown in FIG. 2 in a more detailed manner. The processor 11 operates as each of the encrypted search result generating module 110, the trapdoor generating module 120, the encrypted database searching module 130, the encrypted search result adding module 140, and the encrypted search result deleting module 150 by operations of an encrypted search database managing program.

Further, the data accumulation device 14 operates as each of the encrypted search result storage module 200, the adding information storage module 210, and the deleting information storage module 220. The encrypted search result storage module 200 further includes an encrypted search result array storage unit 201 and an encrypted initial point array storage unit 202.

Among those, the encrypted search result generating module 110, the trapdoor generating module 120, the encrypted database searching module 130, the encrypted search result array storage unit 201, and the encrypted initial point array storage unit 202 are equivalent with the SSE1 described as the related technique, i.e., the encrypted search result generating module 910, the trapdoor generating module 930, the encrypted database searching module 940, the encrypted search result array storage unit 921, and the encrypted initial point array storage unit 922.

As the embodiment, detailed contents of each of the encrypted search result adding module 140, the encrypted search result deleting module 150, the adding information storage module 210, and the deleting information storage module 220 will be described.

(Encrypted Search Result Adding Module)

Figure 3:
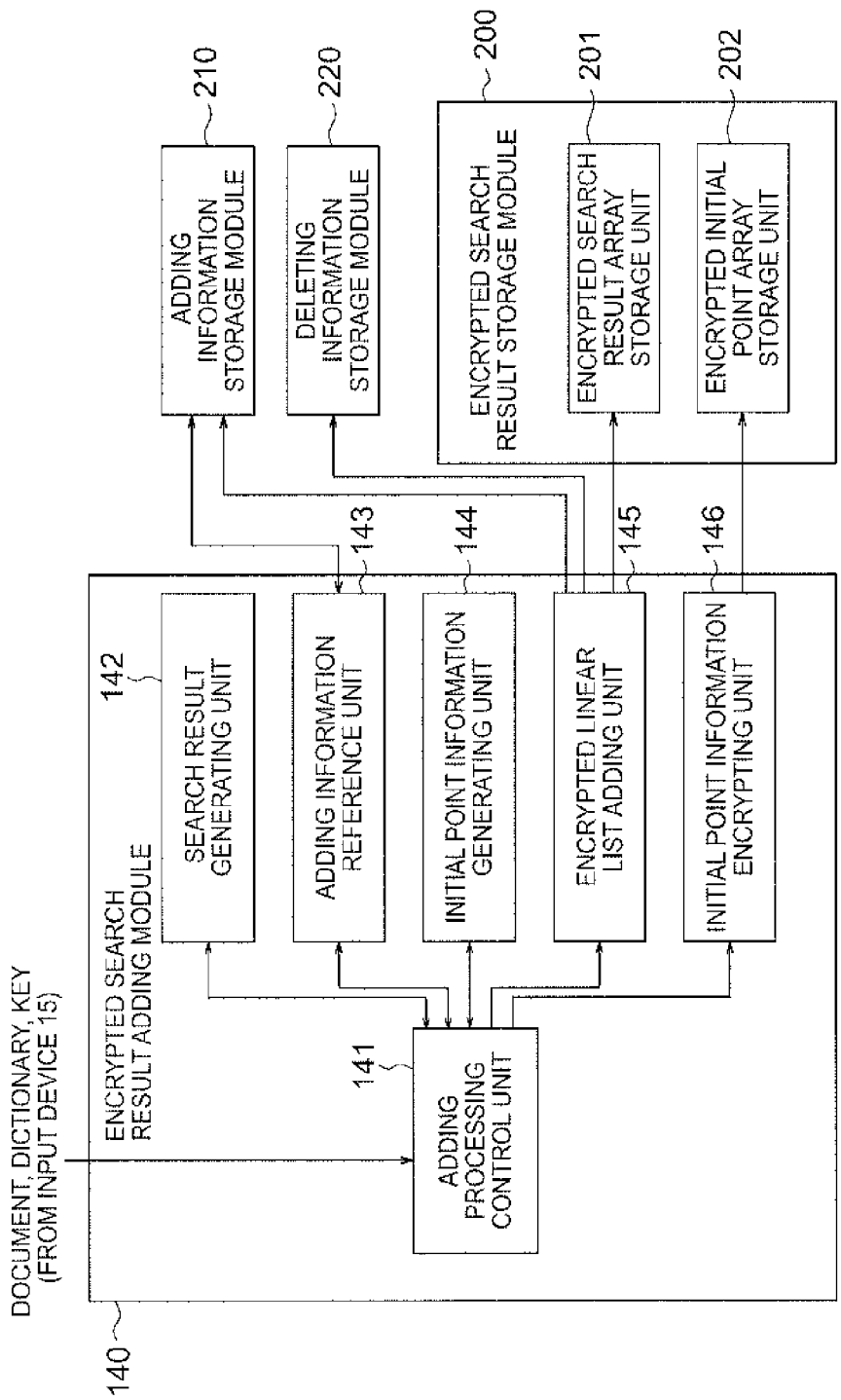
FIG. 3 is an explanatory chart showing a more detailed structure of an encrypted search result adding module shown in FIG. 1.

FIG. 3 is an explanatory chart showing a more detailed structure of the encrypted search result adding module 140 shown in FIG. 1. The encrypted search result adding module 140 includes each of functional units such as the adding processing control unit 141, the search result generating unit 142, the adding information reference unit 143, the initial point information generating unit 144, the encrypted linear list adding unit 145, and the initial point information encrypting unit 146.

By each of those functional units, the encrypted search result adding module 140 updates each of the stored data in the encrypted search result storage module 200, the adding information storage module 210, and the deleting information storage module 220 by taking the key and the document as the target of adding/registration as the input. Note here that the search result as the adding target is referred to as an adding search result.

The search result generating unit 142, the initial point information generating unit 144, and the initial point information encrypting unit 146 are equivalent to the search result generating unit 912, the initial point information generating unit 913, and the initial point information encrypting unit 915 of the encrypted search result generating module 910 (110) described as the related technique, respectively. Therefore, the same modules can be used in a program.

The adding processing control unit 141 controls each of the functional units provided to the encrypted search result adding module 140 by taking the document, the dictionary, and the key as the input. The adding information reference unit 143 refers to the adding information storage module 210 by taking a keyword as the input. When corresponding adding information is stored, the adding information reference unit 143 reads out and outputs the adding information. In other cases, the adding information reference unit 143 outputs that there is no corresponding adding information being stored.

The encrypted linear list adding unit 145 takes a set of initial point information and a search result as the input, generates an encrypted linear list in which those are encrypted, and stores it to the encrypted search result storage module 200. Further, the encrypted linear list adding unit 145 associates the final point information of the encrypted linear list with the keyword, and stores those to the adding information storage module 210. Furthermore, the encrypted linear list adding unit 145 associates the addresses where the ciphertexts of each of the document identifiers are stored with the document identifiers, and stores those to the deleting information storage module 220.

The values stored at the end address ad_end of the encrypted linear list regarding a specific keyword stored in the encrypted search result storage module 200 are expressed as Enc(k_end; id), Enc(k_end; k_next), and Enc(k_end; ad_next).

The encrypted linear text adding unit 145 generates the encrypted linear list of the adding search result by taking ad_next and k_next as the initial point information, and adds it to the encrypted search result array that is stored in the encrypted search result storage module 200. At the same time, ad_next and k_next are associated with the keyword and stored to the adding information storage module 210.

Figure 4:
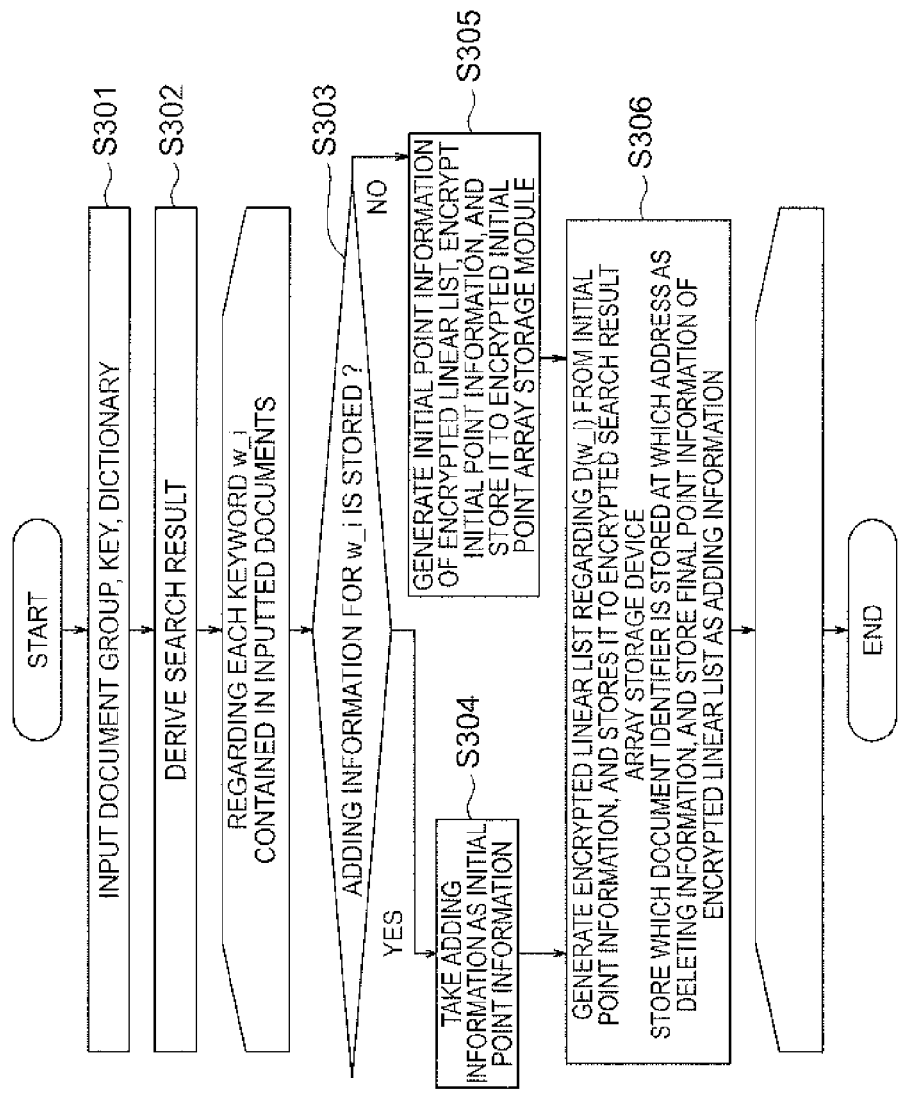
FIG. 4 is a flowchart showing an operation of the encrypted search result adding module shown in FIG. 3.

FIG. 4 is a flowchart showing an operation of the encrypted search result adding module 140 shown in FIG. 3. First, the key K, the document group D, and the dictionary Δ are inputted to the adding processing control unit 141 of the encrypted search result adding module 140 via the input device 15 (step S301). The adding processing control unit 141 upon receiving it inputs the document group D and the dictionary Δ to the search result generating unit 142, and acquires the search result as the output thereof regarding the dictionary Δ of the document group D (step S302).

Hereinafter, the processing of steps S303 to 306 is repeated regarding each keyword w_i contained in the document group D. When the adding processing control unit 141 inputs the keyword w_i to the adding information reference unit 143 (step S303) and adding information is outputted (YES in step S303), it is taken as the initial point information X (step S304). Then the processing is advanced to step S306.

When the adding information is not outputted from the adding information reference unit 143 (NO in step S303), the adding processing control unit 141 starts the initial point information generating unit 144 to give the output thereof to the initial point information encrypting unit 146 as the initial point information X. The initial point information encrypting unit 146 encrypts X by using the key K, and stores the encrypted initial point information X at the address of the encrypted initial point array storage unit 202 defined by the key K and the keyword w_i (step S305).

Then, the adding processing control unit 141 inputs the initial point information X and D(w_i) to the encrypted linear list adding unit 145. The encrypted linear list adding unit 145 generates the encrypted linear list regarding the initial point information X and D(w_i), and stores it to the encrypted search result array storage unit 921. At the same time, the final point information of the encrypted linear list is associated with the keyword w_i and stored to the adding information storage module 210. Further, the addresses where the ciphertexts of each of the document identifiers are stored are associated with the document identifiers and stored to the deleting information storage module 220 (processing heretofore is step S306). The above-described processing of steps S303 to 306 is repeated for all the keywords w_i contained in the document group D.

(Encrypted Search Result Deleting Module)

Figure 5:
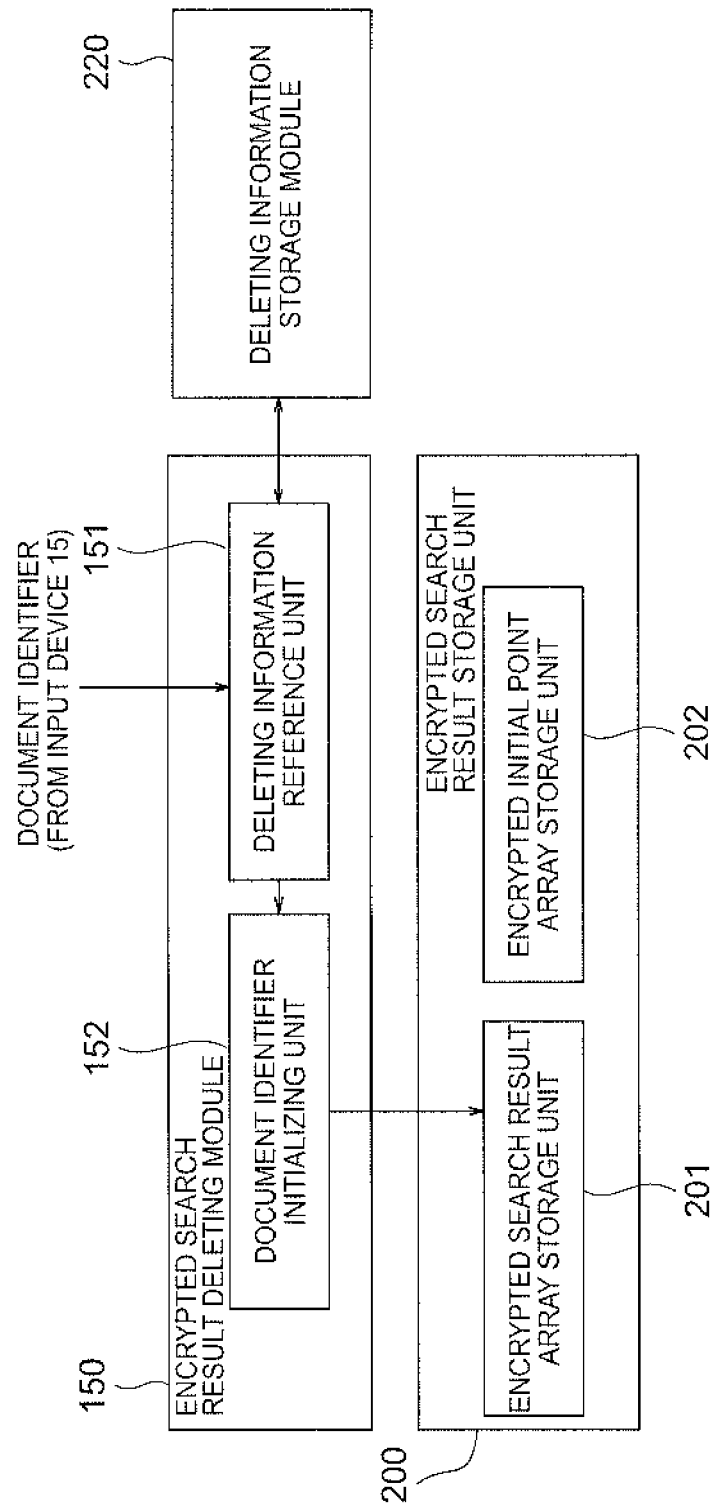
FIG. 5 is an explanatory chart showing a more detailed structure of an encrypted search result deleting module shown in FIG. 1.

FIG. 5 is an explanatory chart showing a more detailed structure of the encrypted search result deleting module 150 shown in FIG. 1. The encrypted search result deleting module 150 includes a deleting information reference unit 151 and a document identifier initializing unit 152. The encrypted search result deleting module 150 uses those functional units to update the data stored in the encrypted search result storage module 200 and the deleting information storage module 220 by taking a document identifier as the input.

The deleting information reference unit 151 reads out the deleting information constituted with a plurality of addresses of the encrypted search result array storage unit 201 corresponding to the inputted document identifier stored in the deleting information storage module 220 by taking the document identifier as the input, deletes it, and inputs it to the document identifier initializing unit 152.

The document identifier initializing unit 152 takes a plurality of addresses of the encrypted search result array storage unit 201 as the input, and initializes the ciphertexts of the document identifiers of the inputted addresses of the encrypted search result array storage unit 201.

Figure 6:
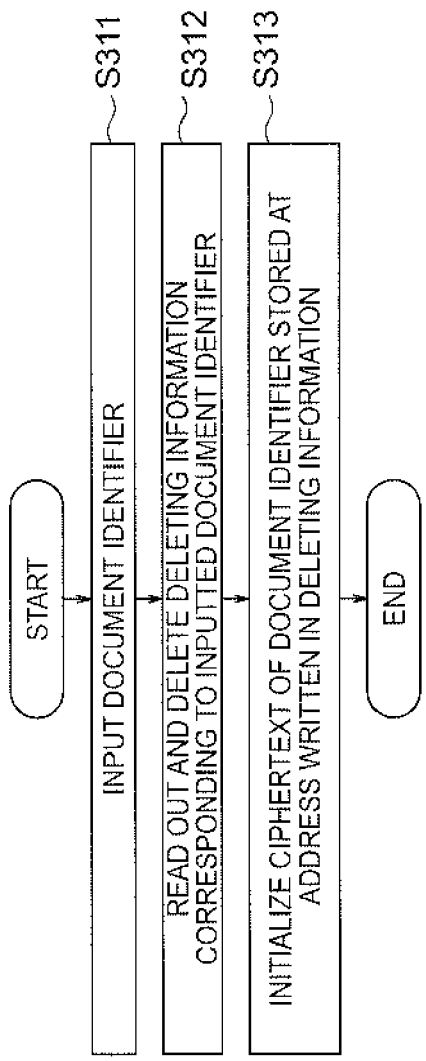
FIG. 6 is a flowchart showing an operation of the encrypted search result deleting module shown in FIG. 5.

FIG. 6 is a flowchart showing an operation of the encrypted search result deleting module 150 shown in FIG. 5. When the document identifier id_d is inputted to the deleting information reference unit 151 (step S311), the deleting information reference unit 151 reads out and deletes the deleting information corresponding to id_d from the deleting information storage module 220, and inputs it to the document identifier initializing unit 152 (step S312). The deleting information herein is constituted with a plurality of addresses within the encrypted search result array storage unit 201.

The document identifier initializing unit 152 initializes the ciphertext of the identifier stored at the address contained in the inputted deleting information of the encrypted search result array storage unit 201 (step S313). When updating the document, the old data may be deleted by the encrypted search result deleting module 150, and the new data may be added by the encrypted search result adding module 140.

(Overall Operations of First Embodiment)

Next, overall operations of the embodiment will be described.

An encrypted search data adding/deleting method according to the embodiment is used with the encrypted search database device which performs searching by using a keyword from a plurality of encrypted and recorded document data, in which: the encrypted search result generating module generates, for each keyword, a search result array as a list of document data corresponding to the keyword, and an initial point array as a list of addresses of the first data corresponding to the keywords in the search result arrays; the encrypted search result generating module encrypts the search result array and the initial point array with a given encryption key, respectively, and stores those to the encrypted search result storage module; the search result generating unit of the encrypted search result adding module generates a linear list that is a list of the search results containing a specific keyword for the newly registered document data; the initial point information generating unit of the encrypted search result adding module generates the initial point information as the address of the first data corresponding to the keyword in the linear list; the initial point information encrypting unit of the encrypted search result adding module encrypts the initial point information with an encryption key and adds/stores it to the encrypted initial point array; the encrypted linear list adding unit of the encrypted search result adding module generates the encrypted linear list acquired by encrypting the linear list with the encryption key and adds/stores it to the encrypted result array; and the encrypted linear list adding unit of the encrypted search result adding module stores each keyword and the final point information as the address of the last data of the encrypted linear list regarding the keyword to the adding information storage module provided in advance as the adding information.

Further, in parallel to the processing for storing the final point information to the adding information storage module, the encrypted linear list adding unit of the encrypted search result adding module stores the addresses on the encrypted search result storage module where the document identifiers of each search result are stored to the deleting information storage module provided in advance. When there is a command for deleting a document regarding a specific document identifier from the user, the encrypted search result deleting module initializes the address on the encrypted search result storage module corresponding to the document identifier stored in the deleting information storage module.

Note here that each of the above-described operation steps may be put into programs that can be executed by a computer so as to be executed by the processor 11 of the information spread scale prediction device 10 which directly executes each of the steps. The program may be recorded in a non-transitory recording medium such as a DVD, a CD, a flash memory, or the like. In that case, the program is read out from the recording medium and executed by a computer. Through this operation, the embodiment can provide following effects.

With the structures described above, the embodiment makes it possible to store the information regarding the end of the encrypted linear list as the adding information when adding the encrypted search data, and to update the encrypted search result by using it. That is, it is unnecessary to perform the processing using the trapdoor for each keyword, which is described as the related technique. Therefore, it is possible to suppress the risk of leaking the information that may occur in the process of the search processing.

Further, which address the information regarding a given document is stored in is stored as the deleting information. Thus, when deleting the encrypted search data, the address may simply be initialized. That is, it is unnecessary to find which address of the encrypted search result array the corresponding identifier exists by using the search processing. Therefore, it is possible to suppress the risk of leaking the information that may occur in the process of the search processing.

Second Embodiment

A second embodiment of the present invention is structured in such a manner that the encrypted linear list adding unit 145 of the structures of the first embodiment is provided with a function which stores the data in which the initial point information, the final point information, and the search result containing a specific keyword are associated with each other instead of storing the data in which the initial point information and the search result containing a specific keyword are associated with each other to the encrypted linear list.

With this structure, it is possible to acquire the same effects as those described in the first embodiment.

Hereinafter, this will be described in more details.

Figure 7:
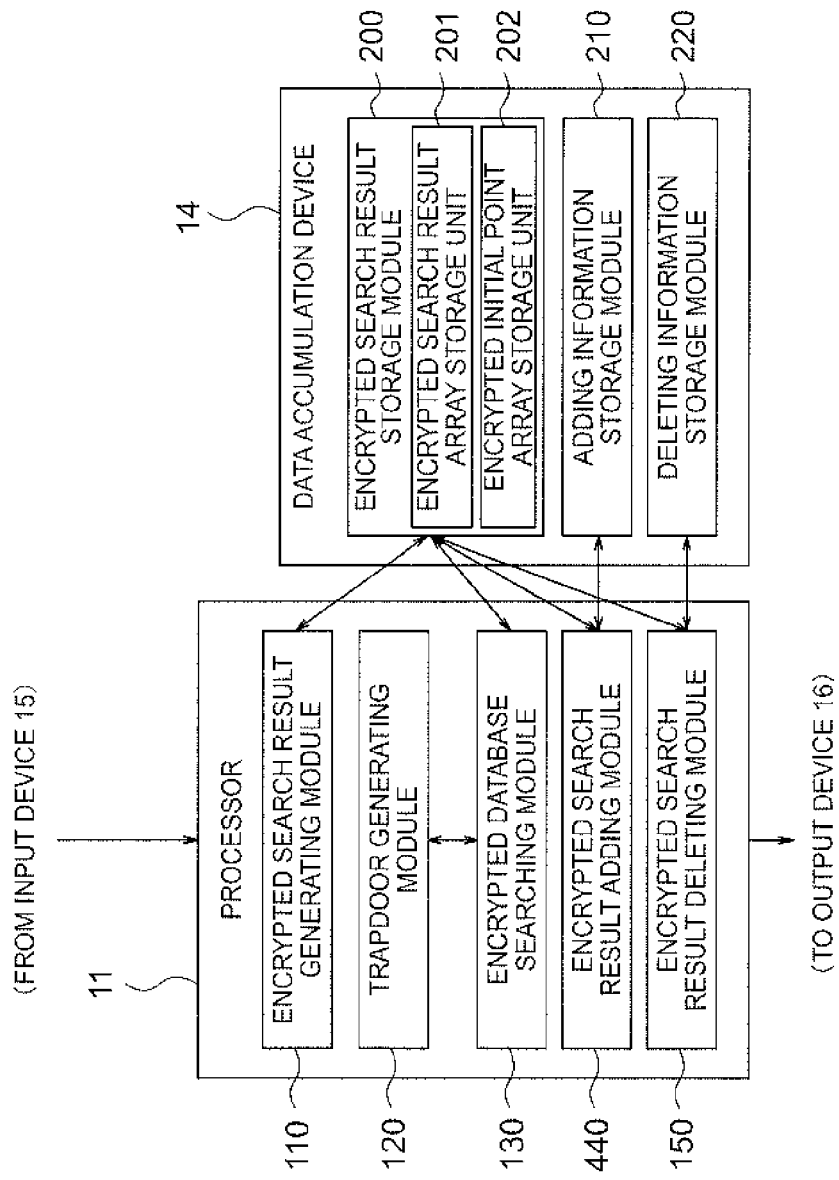
FIG. 7 is an explanatory chart showing the structure of an encrypted search database device according to a second embodiment of the present invention.

FIG. 7 is an explanatory chart showing the structure of an encrypted search database device 410 according to the second embodiment of the present invention. The structure of the encrypted search database device 410 as hardware is completely the same as the encrypted search database device 10 according to the first embodiment shown in FIGS. 1 and 2, so that the same names and same reference numerals are used for the same elements.

The processor 11 of the encrypted search database device 410 operates as each of the encrypted search result generating module 110, the trapdoor generating module 120, the encrypted database searching module 130, the encrypted search result adding module 440, and the encrypted search result deleting module 150 through operations of an encrypted search database management program. Further, the data accumulation device 14 operates as each of the encrypted search result storage module 200, the adding information storage module 210, and the deleting information storage module 220.

That is, the difference between the first and the second embodiments is that only the encrypted search result adding module 140 is replaced with another encrypted search result adding module 440. Other structures of the hardware and the data structure are completely the same, so that the same names and same reference numerals are also used for the same elements. The encrypted search result storage module 440 updates the stored data in the encrypted search result storage module 200, the adding information storage module 210, and the deleting information storage module 220, respectively, by using a method different from that of the encrypted search result adding module 140.

(Encrypted Search Result Adding Module)

Figure 8:
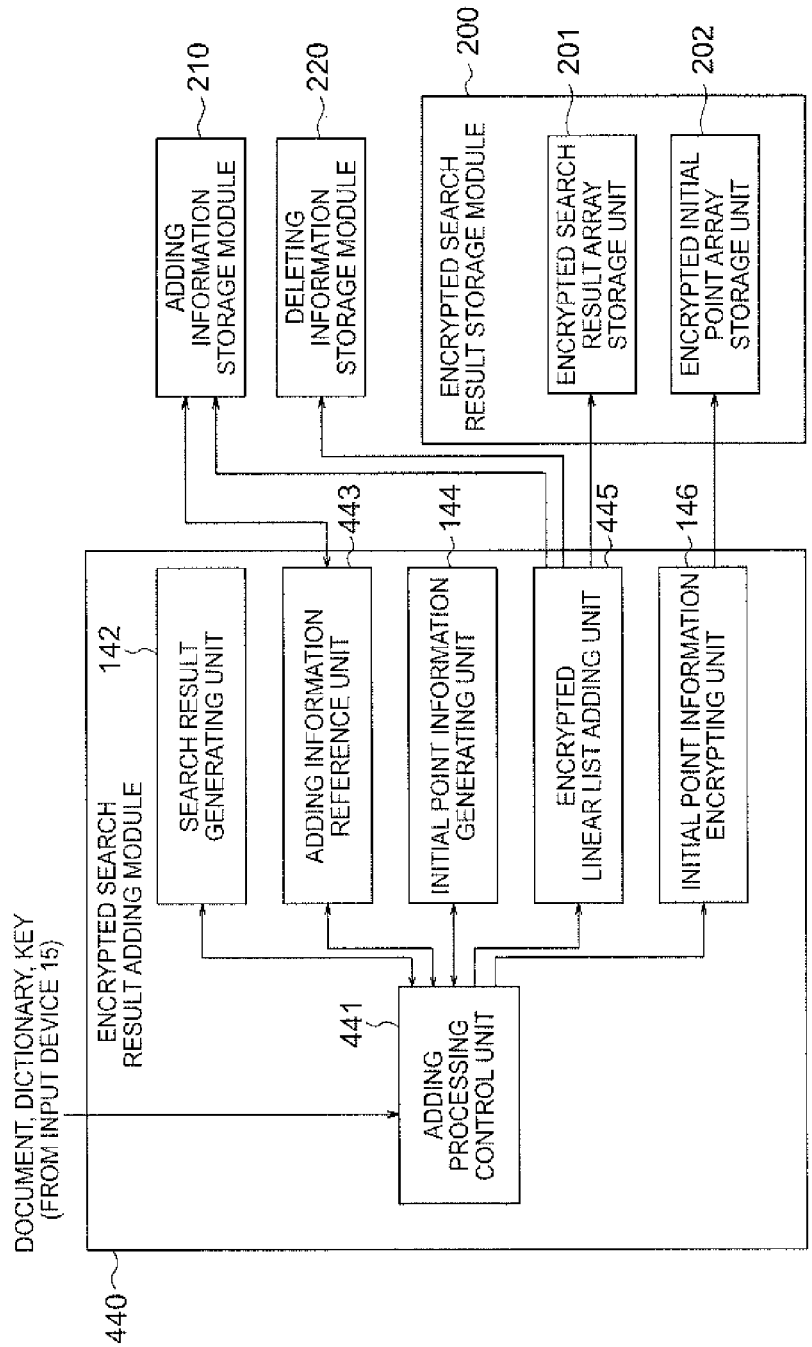
FIG. 8 is an explanatory chart showing a more detailed structure of an encrypted search result adding module shown in FIG. 7.
Figure 10:
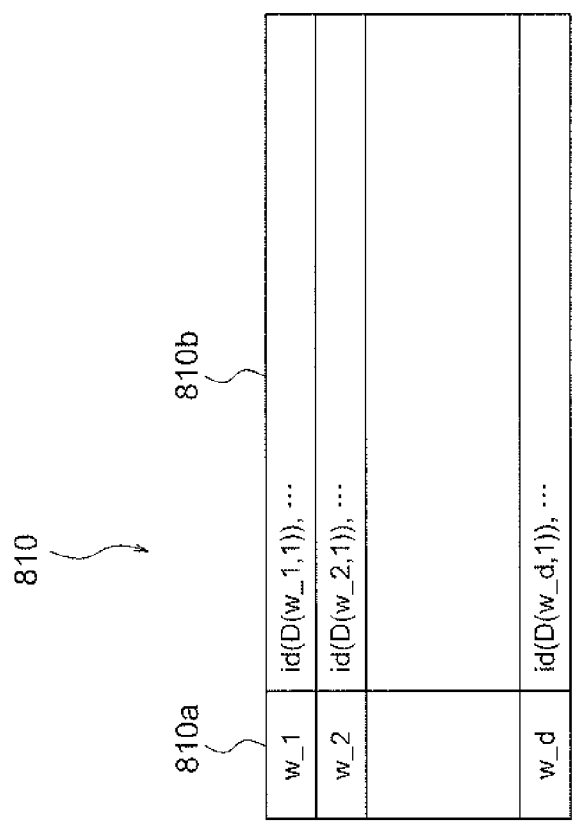
FIG. 10 is an explanatory chart showing the structure of a keyword dictionary (index file) Δ of the SSE system described in Non-Patent Document 1.
Figure 11:
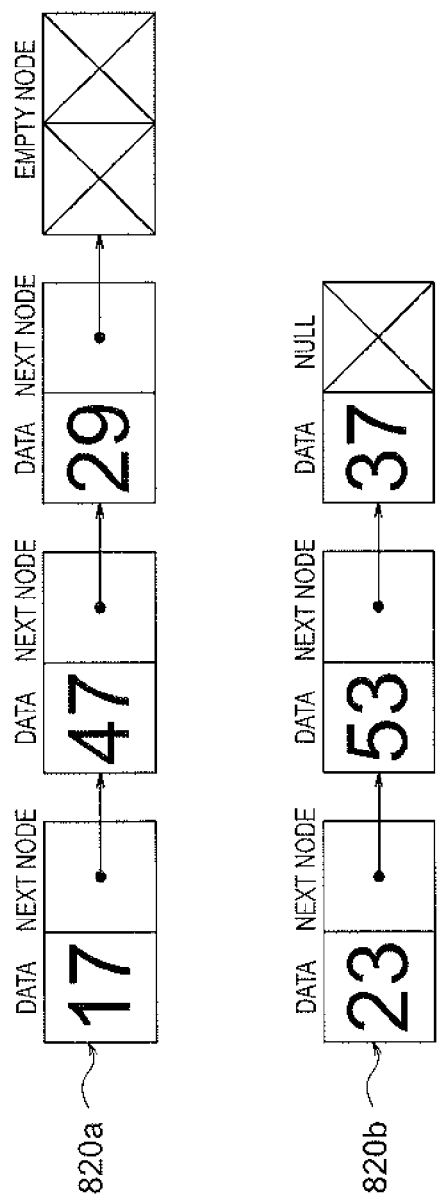
FIG. 11 is an explanatory chart showing an example of a unidirectional list in which three integer values are stored, which is used in a case of the SSE system described in Non-Patent Document 1 shown in FIG. 10.
Figure 12:
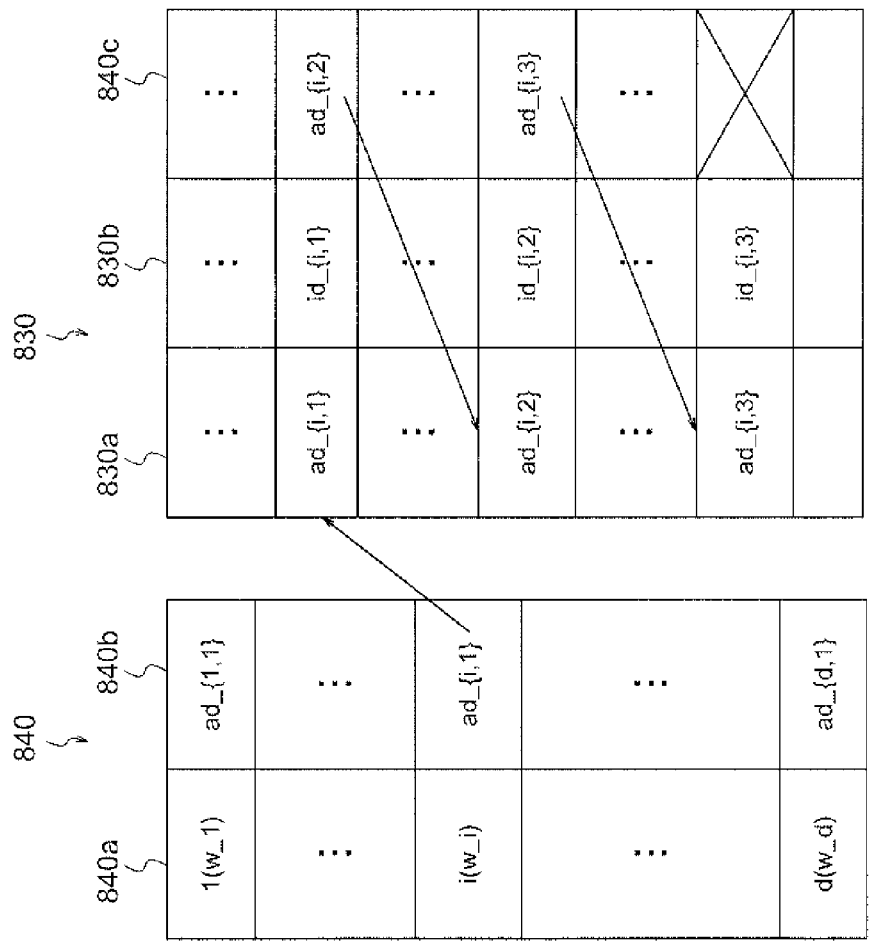
FIG. 12 is an explanatory chart showing a search result array in which a search result regarding a keyword is put into a form of a linear list and showing an initial point array in a case of the SSE system described in Non-Patent Document 1 shown in FIG. 10.
Figure 13:
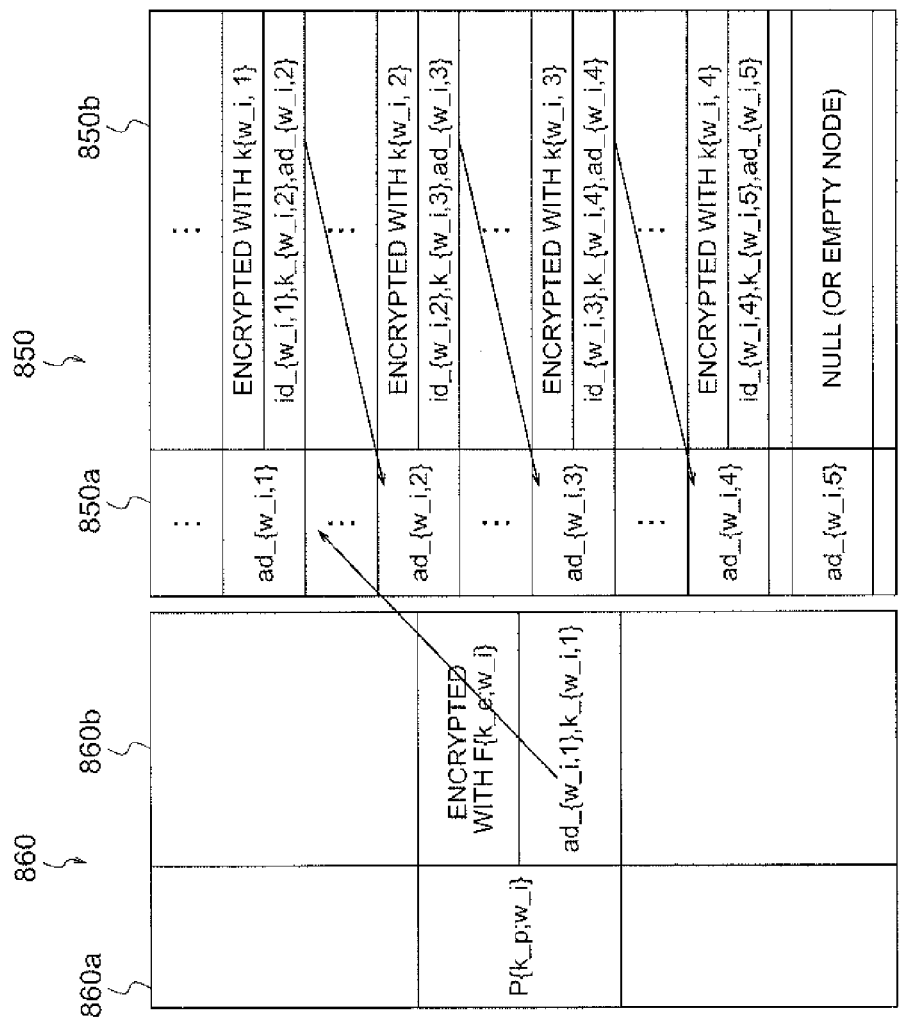
FIG. 13 is an explanatory chart showing an encrypted initial point array and an encrypted search result array using an encrypted linear list in a case of the SSE system (SSE1) described in Non-Patent Document 1 shown in FIG. 10.
Figure 14:
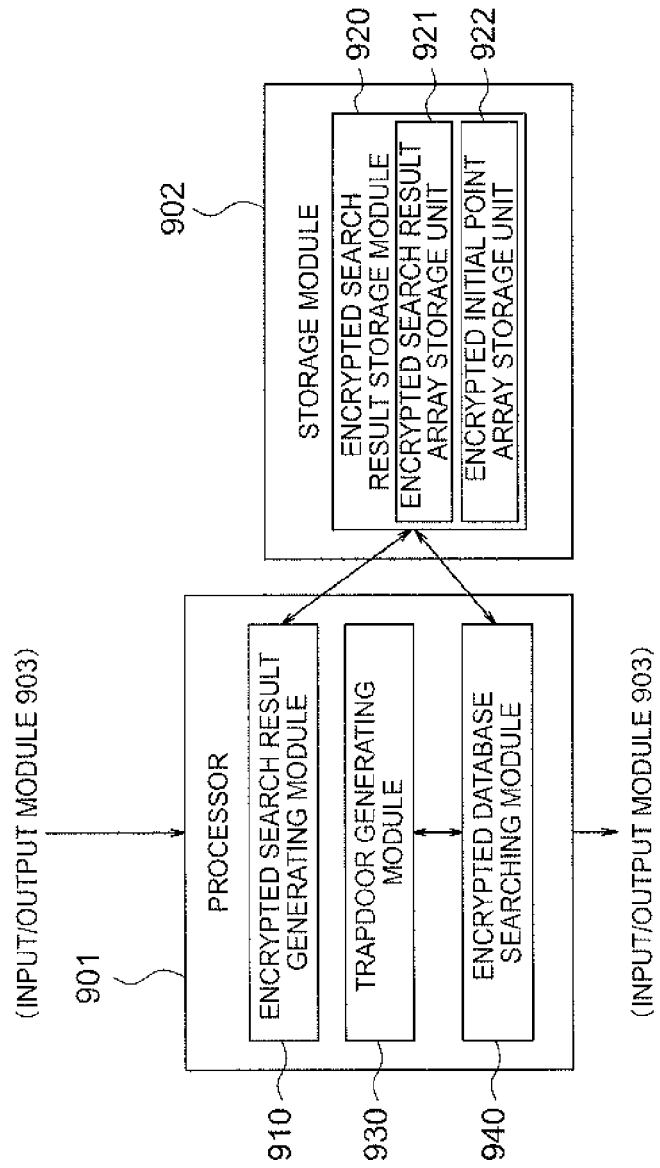
FIG. 14 is an explanatory chart showing the structure of an encrypted database device which executes the SSE system (SSE1) described in Non-Patent Document 1 shown in FIG. 10.
Figure 15:
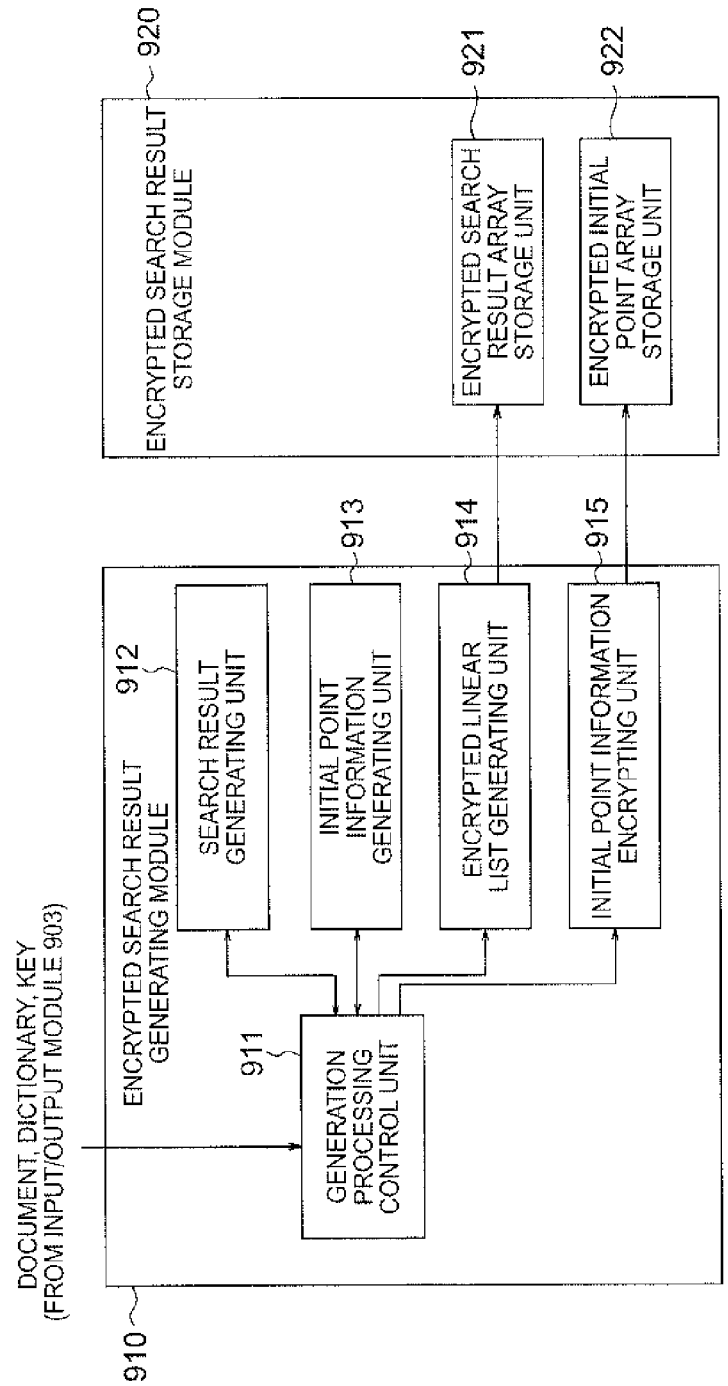
FIG. 15 is an explanatory chart showing the structure of an encrypted search result generating module shown in FIG. 14.
Figure 16:
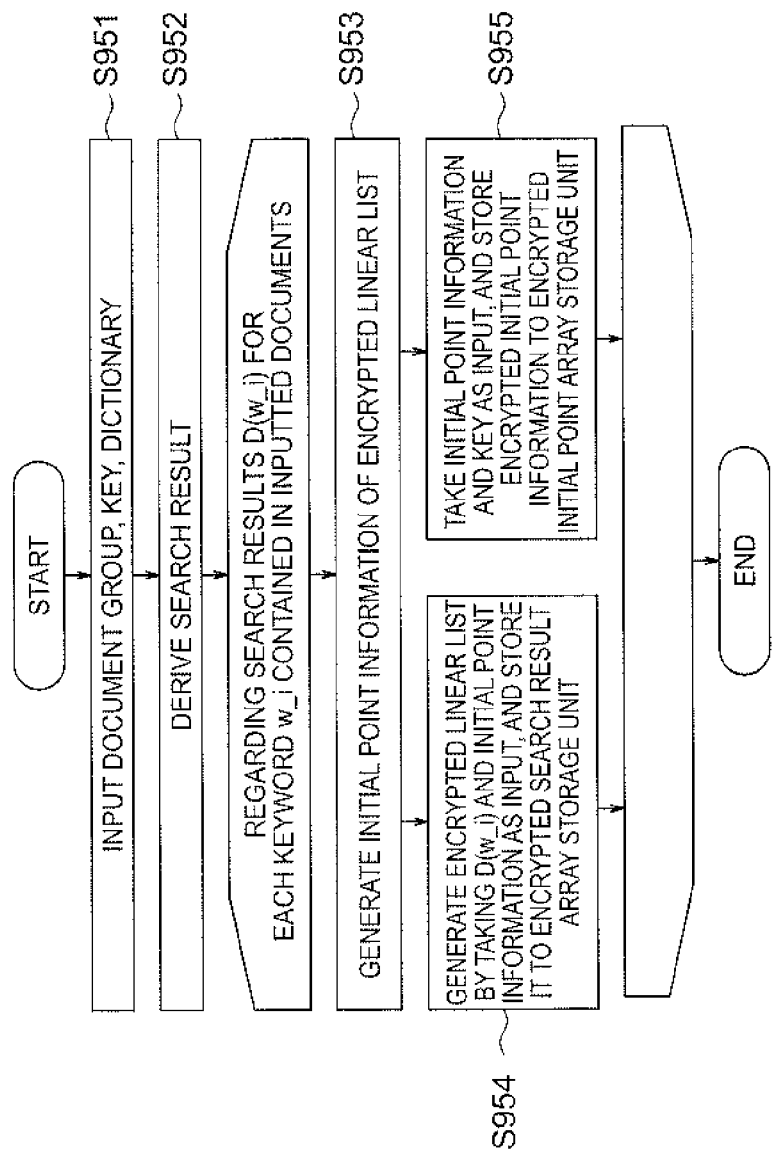
FIG. 16 is a flowchart showing an operation of the encrypted search result generating module shown in FIG. 15.
Figure 17:
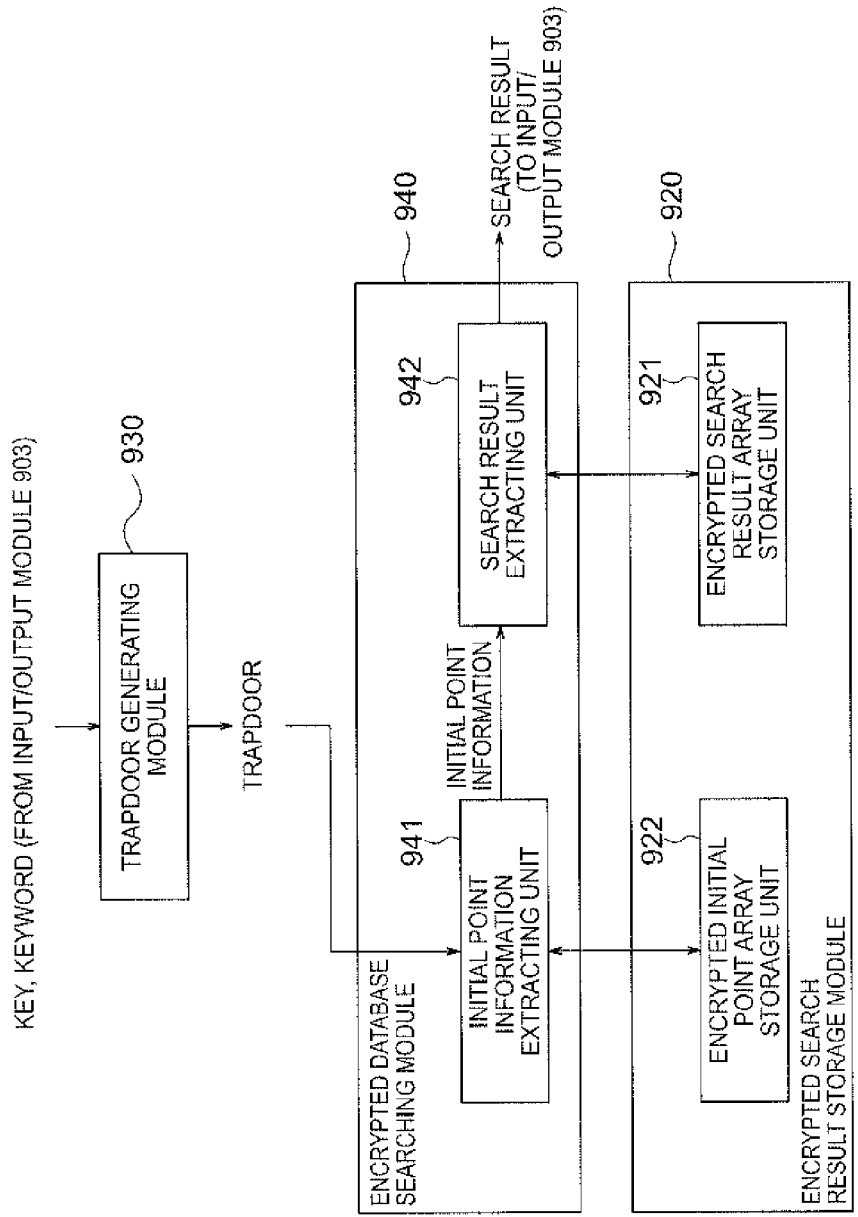
FIG. 17 is an explanatory chart showing the structures of a trapdoor generating module and an encrypted database search module shown in FIG. 14.
Figure 18:
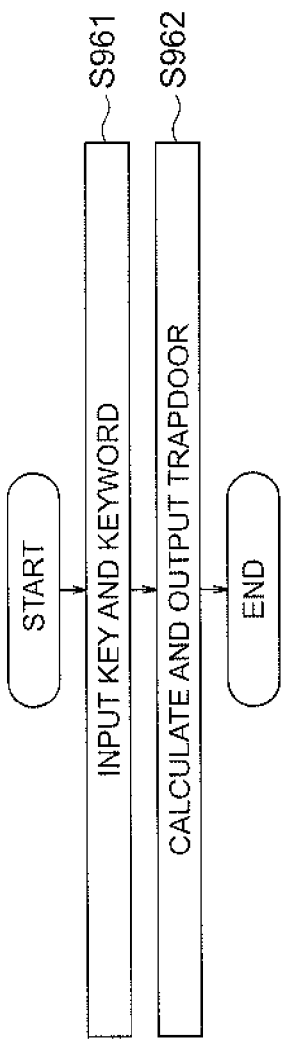
FIG. 18 is a flowchart showing an operation of the trapdoor generating module shown in FIG. 14 and FIG. 17.
Figure 19:
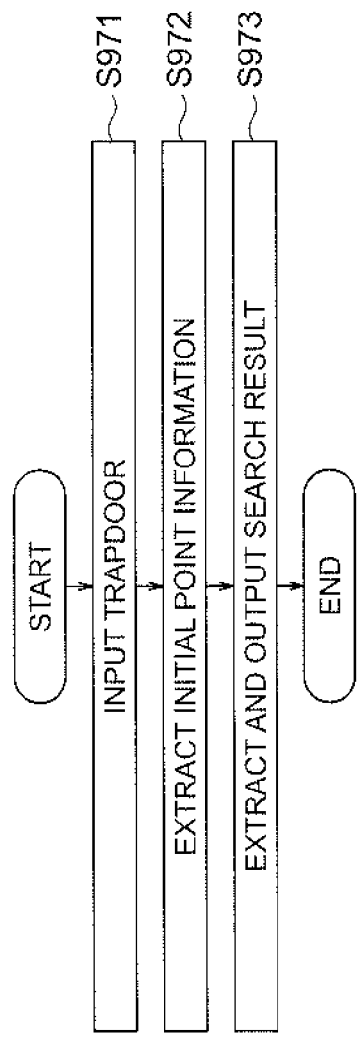
FIG. 19 is a flowchart showing an operation of the encrypted database searching module shown in FIG. 14 and FIG. 17.

FIG. 8 is an explanatory chart showing a more detailed structure of the encrypted search result adding module 440 shown in FIG. 7. The encrypted search result adding module 440 includes each of the functional units such as an adding processing control unit 441, the search result generating unit 142, an adding information reference unit 443, the initial point information generating unit 144, an encrypted linear list adding unit 445, and the initial point information encrypting unit 146.

Among those, the search result generating unit 142, the initial point information generating unit 144, and the initial point information encrypting unit 146 are all in common to those of the first embodiment, and also same as the search result generating unit 912, the initial point information generating unit 913, and the initial point information encrypting unit 915 of the encrypted search result generating module 910 described as the related technique, respectively.

The adding processing control unit 441 controls each of the functional units provided to the encrypted search result adding module 140 by taking the document, the dictionary, and the key as the input. The adding information reference unit 443 refers to the adding information storage module 210 by taking the keyword as the input. When corresponding adding information is stored, the adding information reference unit 443 reads out and outputs the adding information. In other cases, the adding information reference unit 443 outputs that there is no corresponding adding information being stored.

The encrypted linear list adding unit 445 takes a set of initial point information and a search result as the input, generates an encrypted linear list in which those are encrypted, and stores it to the encrypted search result storage module 200. Further, the encrypted linear list adding unit 445 associates the final point information of the encrypted linear list with the keyword, and stores those to the adding information storage module 210. Furthermore, the encrypted linear list adding unit 445 associates the addresses where the ciphertexts of each of the document identifiers are stored with the document identifiers, and stores those to the deleting information storage module 220.

The explanations regarding the functions of the adding processing control unit 441, the adding information reference unit 443, and the encrypted linear list adding unit 445 are the same as those of the first embodiment. However, specific methods of each of those are different from those of the first embodiment. Hereinafter, those points will be described.

A case of adding each document containing keywords w_i, and document identifiers are id__1, - - -, id_x will be shown as an example. In this case, the addresses ad_{w_i} and the keys k_{w_i} of the initial point information of the encrypted linear list regarding the keywords w_i stored in the encrypted search result array storage unit 201 are encrypted and stored in the encrypted initial point array storage unit 202.

At this time, the addresses ad_{w_i}' and the keys k_{w_i}' are generated as the initial point information anew, and stores the values acquired by encrypting those to the encrypted initial point array storage unit 202 as the encrypted initial point information corresponding to w_i. Then, the encrypted linear list of id__1, - - -, id_x having ad_{w_i}' and k_{w_i}' as the initial point information. In the node at the end of the encrypted linear list, ad_{w_i} is used as the next address and k_{w_i} is used as the next address encryption key.

With this processing, the encrypted linear list regarding w_i is stored anew to the encrypted search result array storage unit 201, and the corresponding initial point information is stored to the encrypted initial point array storage unit 202. Required for executing the processing described above are the key used for generating the encrypted search result and the initial point information for each keyword. The initial point information is stored by being associated with each keyword, and the initial point information for each keyword can be acquired from the encrypted initial point information array. Therefore, the encrypted initial point information array in that state can be used as the adding information.

FIG. 9 is a flowchart showing an operation of the encrypted search result adding module 440 shown in FIG. 7. First, the key K, the document group D, and the dictionary Δ are inputted to the adding processing control unit 441 of the encrypted search result adding module 440 via the input device 15 (step S501). The adding processing control unit 441 upon receiving it inputs the document group D and the dictionary Δ to the search result generating unit 142, and acquires the search result as the output thereof regarding the dictionary Δ of the document group D (step S502).

Hereinafter, the processing of steps S503 to 506 is repeated regarding all the keywords w_i contained in the document group D. The adding processing control unit 441 starts the initial point information generating unit 144, takes the output as the initial point information X, and X is encrypted with K by using the initial point information encrypting unit 146 to be stored to the initial point array storage unit 202 (step S503).

Subsequently, the adding processing control unit 441 inputs the keywords w_i to the adding information reference unit 143. When the adding information is outputted, the adding processing control unit 441 takes it as Y (step S504), and inputs X, Y, and D(w_i) to the encrypted linear list adding unit 145. The encrypted linear list adding unit 145 generates the encrypted linear list regarding the initial point information X, the final point information Y, and the search result D(w_i), and stores it to the encrypted search result array storage unit 201 (step S505). When the final point information is not inputted in steps S504 to 505, the value other than the values of the addresses already stored is used as the address of the final point information and a random value is used as the key for the final point information.

At the same time, the final point information of the encrypted linear list is associated with the keyword and stored to the adding information storage module 210. Further, the addresses where the ciphertexts of each of the document identifiers are stored are associated with the document identifiers and stored to the deleting information storage device (step S505). The above-described processing of steps S503 to 505 is repeated for all the keywords w_i contained in the document group D.

(Expansion of Embodiments)

Various expansions can be done on the first and second embodiments described above without departing from the spirit and the scope of the present invention. Hereinafter, examples of the expansions will be described.

As described above, the encrypted search database device may not be constituted with a single computer alone but may be constituted with a plurality of computers connected mutually via a network. Especially, generally considered is the server-client structure in which the input device and the output device are client devices operated by the user and the processing regarding the actual search is executed by a server device. Further, the server device may also be constituted with a plurality of computers to distribute the load.

In that case, each of the computers constituting the server and the client is connected within a same local network within the organization, and it is desirable to let only those who are authenticated within the organization can use the encrypted search database. Further, it is desirable for the network to be equipped with hardware and software regarding the security such as firewall or antivirus and to be operated according to a certain security policy. Those are not within the scope of the present invention, so that the details thereof are not described herein.

While the present invention has been described above by referring to the specific embodiments shown in the drawings, the present invention is not limited only to the embodiments described above. Any other known structures can be employed, as long as the effects of the present invention can be achieved therewith.

Regarding each of the embodiments described above, the new technical contents of the above-described embodiments can be summarized as follows. While a part of or a whole part of the embodiments can be summarized as follows as the new techniques, the present invention is not necessarily limited only to the followings.

(Supplementary Note 1)

An encrypted search database device which performs searching by using a keyword from a plurality of encrypted and registered document data, which includes:

an encrypted search result generating module which generates, for the respective keyword, a search result array as a list of the document data corresponding to the keywords and an initial point array as a list of addresses of first data corresponding to the keyword in the search result array, and generates an encrypted search result array and an encrypted initial point array by encrypting each of those with a given encryption key; an encrypted search result storage module which stores the generated encrypted search result array and the encrypted initial point array; an encrypted database searching module which performs searching by the keyword from the encrypted search result array and the encrypted initial point array by using the keyword and the encryption key; and an encrypted search result adding module which adds contents regarding the document data that is newly registered to the encrypted search result array and the encrypted initial point array, wherein:

the encrypted search result adding module includes a search result generating unit which generates a linear list that is a list of the search results containing a specific keyword for the newly registered document data, an initial point information generating unit which generates initial point information that is the address of the first data corresponding to the keyword in the linear list, an initial point information encrypting unit which encrypts the generated initial point information with the encryption key, and adds/stores it to the encrypted initial point array, an encrypted linear list adding unit which generates an encrypted linear list acquired by encrypting the linear list with the encryption key, and adds/stores it to the encrypted search result array; and the encrypted linear list adding unit has a function which stores the respective keyword and the final point information that is the address of the last data in the encrypted linear list for the keyword to an adding information storage module provided in advance as adding information.

(Supplementary Note 2)

The encrypted search database device as depicted in Supplementary Note 1, wherein:

the encrypted search result adding module includes an adding information reference unit which reads out the adding information when the adding information is stored in the adding information storage module; and the encrypted linear list adding unit includes a function which generates the encrypted linear list by taking the adding information read out by the adding information reference unit as the initial point information.

(Supplementary Note 3)

The encrypted search database device as depicted in Supplementary Note 1, wherein the encrypted linear list adding unit includes a function which stores, to the encryption linear list, data in which the initial point information and a search result containing the specific keyword are associated with each other.

(Supplementary Note 4)

The encrypted search database device as depicted in Supplementary Note 1, wherein the encrypted linear list adding unit includes a function which stores, to the encryption linear list, data in which the initial point information, the final point information, and a search result containing the specific keyword are associated with each other.

(Supplementary Note 5)

The encrypted search database device as depicted in Supplementary Note 1, wherein the encrypted linear list adding unit of the encrypted search result adding module includes a function which stores, to a deleting information storage module provided in advance, addresses on the encrypted search result storage module where document identifiers of each of the search results are stored, and the database device includes an encrypted search result deleting module which, when there is a command for deleting a document regarding a specific document identifier from a user, initializes the address on the encrypted search result storage module corresponding to the document identifier stored in the deleting information storage module.

(Supplementary Note 6)

An encrypted search data adding/deleting method used with an encrypted search database device which performs searching by using a keyword from a plurality of encrypted and registered document data, wherein:

an encrypted search result generating module generates, for the respective keyword, a search result array as a list of the document data corresponding to the keyword and an initial point array as a list of addresses of first data corresponding to the keyword in the search result arrays;

the encrypted search result generating module encrypts the search result array and the initial point array with a given encryption key, respectively, and stores those to an encrypted search result storage module;

a search result generating unit of an encrypt search result adding module generates a linear list that is a list of the search results containing a specific keyword for a newly registered document data;

an initial point information generating unit of the encrypted search result adding module generates initial point information that is the address of first data corresponding to the keyword in the linear list;

an initial point information encrypting unit of the encrypted search result adding module encrypts the generated initial point information with the encryption key, and adds/stores it to the encrypted initial point array;

an encrypted linear list adding unit of the encrypted search result adding module generates an encrypted linear list acquired by encrypting the linear list with the encryption key, and adds/stores it to the encrypted search result array; and the encrypted linear list adding unit of the encrypted search result adding module stores the respective keyword and the final point information that is the address of the last data in the encrypted linear list for the keyword to an adding information storage module provided in advance as adding information.

(Supplementary Note 7)

The encrypted search data adding/deleting method as depicted in Supplementary Note 6, wherein:

in parallel to processing for storing the final point information to the adding information storage module, the encrypted linear list adding unit of the encrypted search result adding module stores, to a deleting information storage module provided in advance, addresses on the encrypted search result storage module where document identifiers of each of the search results are stored; and when there is a command for deleting a document regarding a specific document identifier from a user, an encrypted search result deleting module initializes the address on the encrypted search result storage module corresponding to the document identifier stored in the deleting information storage module.

(Supplementary Note 8)

An encrypted search data adding/deleting program used with an encrypted search database device which performs searching by using a keyword from a plurality of encrypted and registered document data, which causes a computer provided to the encrypted search database device to execute:

a procedure for generating, for the respective keyword, a search result array as a list of the document data corresponding to the keyword and an initial point array as a list of addresses of first data corresponding to the keyword in the search result array;

a procedure for encrypting the search result array and the initial point array with a given encryption key, respectively, and storing those to an encrypted search result storage module;

a procedure for generating a linear list that is a list of the search results containing a specific keyword for a newly registered document data;

a procedure for generating initial point information that is the address of first data corresponding to the keyword in the linear list;

a procedure for encrypting the initial point information with the encryption key, and adding/storing it to the encrypted initial point array;

a procedure for generating an encrypted linear list acquired by encrypting the linear list with the encryption key, and adding/storing it to the encrypted search result array; and a procedure for storing the respective keyword and the final point information that is the address of the last data in the encrypted linear list for the keyword to an adding information storage module provided in advance as adding information.

(Supplementary Note 9)

The encrypted search data adding/deleting program as depicted in Supplementary Note 8, which causes the computer provided to the encrypted search database device to execute:

in parallel to processing for storing the final point information to the adding information storage module, a procedure for storing, to a deleting information storage module provided in advance, addresses on the encrypted search result storage module where document identifiers of each of the search results are stored; and when there is a command for deleting a document regarding a specific document identifier from a user, a procedure for initializing the address on the encrypted search result storage module corresponding to the document identifier stored in the deleting information storage module.

This application claims the Priority right based on Japanese Patent Application No. 2011-269740 filed on Dec. 9, 2011 and the disclosure thereof is hereby incorporated by reference in its entirety.

INDUSTRIAL APPLICABILITY

The present invention can be used in an information system including a database. More specifically, the present invention is preferably used in a database that carries a vast amount of confidential information in an information system within an organization such as a business enterprise.

REFERENCE NUMERALS

10, 410 Encrypted search database device
11 Processor
12 Main storage device
12a, 13a, 14a Memory control interface
13 Storage medium drive
14 Data accumulation device 15 Input device
15a, 16a I/O interface
16 Output device
17 Bus
110 Encrypted search result generating module
120 Trapdoor generating module
130 Encrypted database searching module
140, 440 Encrypted search result adding module
141, 441 Adding processing control unit
142 Search result generating unit
143, 443 Adding information reference unit
144 Initial point information generating unit
145, 445 Encrypted linear list adding unit
146 Initial point information encrypting unit
150 Encrypted search result deleting module
151 Deleting information reference unit
152 Document identifier initializing unit
200 Encrypted search result array storage module
201 Encrypted search result array storage unit
202 Encrypted initial point array storage unit
210 Adding information storage module
220 Deleting information storage module

The invention claimed is:

1. An encrypted search database device which performs searching by using a keyword from a plurality of encrypted and registered document data, comprising:
an encrypted search result generating module which generates, for the respective keyword, a search result array as a list of the document data corresponding to the keywords and an initial point array as a list of addresses of first data corresponding to the keyword in the search result array, and generates an encrypted search result array and an encrypted initial point array by encrypting each of those with a given encryption key; an encrypted search result storage module which stores the generated encrypted search result array and the encrypted initial point array; an encrypted database searching module which performs searching by the keyword from the encrypted search result array and the encrypted initial point array by using the keyword and the encryption key; and an encrypted search result adding module which adds contents regarding the document data that is newly registered to the encrypted search result array and the encrypted initial point array, wherein:
the encrypted search result adding module includes
a search result generating unit which generates a linear list that is a list of the search results containing a specific keyword for the newly registered document data,
an initial point information generating unit which generates initial point information that is the address of the first data corresponding to the keyword in the linear list,
an initial point information encrypting unit which encrypts the generated initial point information with the encryption key, and adds/stores it to the encrypted initial point array,
an encrypted linear list adding unit which generates an encrypted linear list acquired by encrypting the linear list with the encryption key, and adds/stores it to the encrypted search result array; and
the encrypted linear list adding unit has a function which stores the respective keyword and the final point information that is the address of the last data in the encrypted linear list for the keyword to an adding information storage module provided in advance as adding information.

2. The encrypted search database device as claimed in claim 1, wherein:
the encrypted search result adding module comprises an adding information reference unit which reads out the adding information when the adding information is stored in the adding information storage module; and
the encrypted linear list adding unit includes a function which generates the encrypted linear list by taking the adding information read out by the adding information reference unit as the initial point information.

3. The encrypted search database device as claimed in claim 1, wherein
the encrypted linear list adding unit includes a function which stores, to the encryption linear list, data in which the initial point information and a search result containing the specific keyword are associated with each other.

4. The encrypted search database device as claimed in claim 1, wherein
the encrypted linear list adding unit includes a function which stores, to the encryption linear list, data in which the initial point information, the final point information, and a search result containing the specific keyword are associated with each other.

5. The encrypted search database device as claimed in claim 1, wherein
the encrypted linear list adding unit of the encrypted search result adding module includes a function which stores, to a deleting information storage module provided in advance, addresses on the encrypted search result storage module where document identifiers of each of the search results are stored, and
the database device comprises an encrypted search result deleting module which, when there is a command for deleting a document regarding a specific document identifier from a user, initializes the address on the encrypted search result storage module corresponding to the document identifier stored in the deleting information storage module.

6. An encrypted search data adding/deleting method used with an encrypted search database device which performs searching by using a keyword from a plurality of encrypted and registered document data, wherein:
an encrypted search result generating module generates, for the respective keyword, a search result array as a list of the document data corresponding to the keyword and an initial point array as a list of addresses of first data corresponding to the keyword in the search result arrays;
the encrypted search result generating module encrypts the search result array and the initial point array with a given encryption key, respectively, and stores those to an encrypted search result storage module;
a search result generating unit of an encrypt search result adding module generates a linear list that is a list of the search results containing a specific keyword for a newly registered document data;
an initial point information generating unit of the encrypted search result adding module generates initial point information that is the address of first data corresponding to the keyword in the linear list;
an initial point information encrypting unit of the encrypted search result adding module encrypts the generated initial point information with the encryption key, and adds/stores it to the encrypted initial point array;
an encrypted linear list adding unit of the encrypted search result adding module generates an encrypted linear list acquired by encrypting the linear list with the encryption key, and adds/stores it to the encrypted search result array; and the encrypted linear list adding unit of the encrypted search result adding module stores the respective keyword and the final point information that is the address of the last data in the encrypted linear list for the keyword to an adding information storage module provided in advance as adding information.

7. The encrypted search data adding/deleting method as claimed in claim 6, wherein:
in parallel to processing for storing the final point information to the adding information storage module, the encrypted linear list adding unit of the encrypted search result adding module stores, to a deleting information storage module provided in advance, addresses on the encrypted search result storage module where document identifiers of each of the search results are stored; and
when there is a command for deleting a document regarding a specific document identifier from a user, an encrypted search result deleting module initializes the address on the encrypted search result storage module corresponding to the document identifier stored in the deleting information storage module.

8. A non-transitory computer readable recording medium storing an encrypted search data adding/deleting program used with an encrypted search database device which performs searching by using a keyword from a plurality of encrypted and registered document data, which causes a computer provided to the encrypted search database device to execute:
a procedure for generating, for the respective keyword, a search result array as a list of the document data corresponding to the keyword and an initial point array as a list of addresses of first data corresponding to the keyword in the search result array;
a procedure for encrypting the search result array and the initial point array with a given encryption key, respectively, and storing those to an encrypted search result storage module;
a procedure for generating a linear list that is a list of the search results containing a specific keyword for a newly registered document data;
a procedure for generating initial point information that is the address of first data corresponding to the keyword in the linear list;
a procedure for encrypting the initial point information with the encryption key, and adding/storing it to the encrypted initial point array;
a procedure for generating an encrypted linear list acquired by encrypting the linear list with the encryption key, and adding/storing it to the encrypted search result array; and
a procedure for storing the respective keyword and the final point information that is the address of the last data in the encrypted linear list for the keyword to an adding information storage module provided in advance as adding information.

9. The non-transitory computer readable recording medium storing the encrypted search data adding/deleting program as claimed in claim 8, which causes the computer provided to the encrypted search database device to execute:
in parallel to processing for storing the final point information to the adding information storage module, a procedure for storing, to a deleting information storage module provided in advance, addresses on the encrypted search result storage module where document identifiers of each of the search results are stored; and
when there is a command for deleting a document regarding a specific document identifier from a user, a procedure for initializing the address on the encrypted search result storage module corresponding to the document identifier stored in the deleting information storage module.

10. An encrypted search database device which performs searching by using a keyword from a plurality of encrypted and registered document data, comprising:
encrypted search result generating means for generating, for the respective keyword, a search result array as a list of the document data corresponding to the keywords and an initial point array as a list of addresses of first data corresponding to the keyword in the search result array, and generating an encrypted search result array and an encrypted initial point array by encrypting each of those with a given encryption key; encrypted search result storage means for storing the generated encrypted search result array and the encrypted initial point array; encrypted database searching means for performing searching by the keyword from the encrypted search result array and the encrypted initial point array by using the keyword and the encryption key; and encrypted search result adding means for adding contents regarding the document data that is newly registered to the encrypted search result array and the encrypted initial point array, wherein:
the encrypted search result adding means includes
search result generating means for generating a linear list that is a list of the search results containing a specific keyword for the newly registered document data,
initial point information generating means for generating initial point information that is the address of the first data corresponding to the keyword in the linear list,
initial point information encrypting means for encrypting the generated initial point information with the encryption key, and adding/storing it to the encrypted initial point array,
encrypted linear list adding means for generating an encrypted linear list acquired by encrypting the linear list with the encryption key, and adding/storing it to the encrypted search result array; and
the encrypted linear list adding means has a function which stores the respective keyword and the final point information that is the address of the last data in the encrypted linear list for the keyword to an adding information storage module provided in advance as adding information.

* * * * *